US012728063B2

(12) United States Patent
Lim et al.

(10) Patent No.: US 12,728,063 B2
(45) Date of Patent: Sep. 8, 2026

(54) METHOD AND APPARATUS FOR ADJUSTING CONTROL PARAMETER VALUES OF WEARABLE DEVICE

(71) Applicant: SAMSUNG ELECTRONICS CO., LTD., Suwon-si (KR)

(72) Inventors: Bokman Lim, Suwon-si (KR); Kyungrock Kim, Suwon-si (KR); Jungsik Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 933 days.

(21) Appl. No.: 17/955,033

(22) Filed: Sep. 28, 2022

(65) Prior Publication Data

US 2023/0031376 A1 Feb. 2, 2023

Related U.S. Application Data

(63) Continuation of application No. PCT/KR2022/007919, filed on Jun. 3, 2022.

(30) Foreign Application Priority Data

Jun. 7, 2021 (KR) ........................ 10-2021-0073671
Nov. 19, 2021 (KR) ........................ 10-2021-0160166

(51) Int. Cl.
*A61H 3/00* (2006.01)
*A61H 1/02* (2006.01)

(52) U.S. Cl.
CPC ............... *A61H 3/00* (2013.01); *A61H 1/024* (2013.01); *A61H 1/0244* (2013.01);
(Continued)

(58) Field of Classification Search
CPC ........ A61H 3/00; A61H 1/024; A61H 1/0244; A61H 1/0266; A61H 2201/1207;
(Continued)

(56) References Cited

U.S. PATENT DOCUMENTS

| | | | | |
|---|---|---|---|---|
| 9,610,209 | B2 | 4/2017 | Yasuhara et al. | |
| 10,555,865 | B2 * | 2/2020 | Zhang | G05D 17/02 |

(Continued)

FOREIGN PATENT DOCUMENTS

| | | | |
|---|---|---|---|
| CN | 108309689 | B | 6/2020 |
| JP | 2018-50881 | A | 4/2018 |

(Continued)

OTHER PUBLICATIONS

Chika U. Eke, Stephen M. Cain, Leia A. Stirling, Strategy quantification using body worn inertial sensors in a reactive agility task, Journal of Biomechanics, vol. 64, 2017, pp. 219-225, ISSN 0021-9290 (Year: 2017).*

(Continued)

*Primary Examiner* — Victoria Murphy
*Assistant Examiner* — Kris Hanyu Gong
(74) *Attorney, Agent, or Firm* — Sughrue Mion, PLLC

(57) ABSTRACT

Provided are a method and apparatus for adjusting a control parameter value in association with a torque output to provide a force to a user, which, when the user performs a test walk while wearing a wearable device, assesses suitability of the control parameter value used for outputting the torque based on the torque output through the test walk and state information of a joint of the user and adjusts the control parameter value such that the user feels convenience in walking, in order to adjust the control parameter value.

18 Claims, 17 Drawing Sheets

(52) U.S. Cl.
CPC ... *A61H 1/0266* (2013.01); *A61H 2201/1207* (2013.01); *A61H 2201/1261* (2013.01); *A61H 2201/1628* (2013.01); *A61H 2201/164* (2013.01); *A61H 2201/5007* (2013.01); *A61H 2201/5058* (2013.01); *A61H 2201/5069* (2013.01); *A61H 2201/5079* (2013.01); *A61H 2201/5097* (2013.01)

(58) Field of Classification Search
CPC .... A61H 2201/1261; A61H 2201/1628; A61H 2201/164; A61H 2201/5007; A61H 2201/5058; A61H 2201/5069; A61H 2201/5079; A61H 2201/5097; A61H 1/0237; A61H 2003/007; A61H 2201/165; A61H 2201/5005; A61H 2201/5061; A61H 2201/5071; A61H 2201/5084; A61B 5/00; A61B 5/112; B25J 9/00; B25J 9/0006
See application file for complete search history.

(56) References Cited

U.S. PATENT DOCUMENTS

| | | | | |
|---|---|---|---|---|
| 11,498,203 | B2 * | 11/2022 | Ding | B25J 9/163 |
| 2014/0121575 | A1 | 5/2014 | Yasuhara et al. | |
| 2017/0027802 | A1 * | 2/2017 | Jang | A61H 1/0244 |
| 2018/0360347 | A1 * | 12/2018 | Lim | A61B 5/1116 |
| 2020/0214925 | A1 | 7/2020 | Lim et al. | |
| 2020/0276698 | A1 | 9/2020 | Ding et al. | |
| 2020/0390637 | A1 | 12/2020 | Hyung et al. | |
| 2021/0085553 | A1 | 3/2021 | Lim et al. | |
| 2021/0378903 | A1 * | 12/2021 | Mooney | A61H 3/00 |
| 2022/0176561 | A1 * | 6/2022 | Smith | B25J 19/0004 |

FOREIGN PATENT DOCUMENTS

| | | | |
|---|---|---|---|
| JP | 2018-61663 | A | 4/2018 |
| KR | 10-2016-0062933 | A | 6/2016 |
| KR | 10-2017-0016638 | A | 2/2017 |
| KR | 10-2020-0034705 | A | 3/2020 |
| KR | 10-2020-0085083 | A | 7/2020 |
| KR | 10-2021-0030332 | A | 3/2021 |

OTHER PUBLICATIONS

Zhang et al., "Human-in-the-loop optimization of exoskeleton assistance during walking", Science, 2017, (11 pages total).
Ding et al., "Human-in-the-loop optimization of hip assistance with a soft exosuit during walking", Science Robotics, Feb. 28, 2018, (9 pages total).
Koller et al., "'Body-in-the-Loop' Optimization of Assistive Robotic Devices: A Validation Study", In Robotics: Science and Systems, Robotics: Science and Systems, 2016, (10 pages total).
Extended European Search Report dated Sep. 12, 2024, issued by the European Patent Office in European Application No. 22820489.7.
Communication issued on Nov. 13, 2025 by the China National Intellectual Property Administration in Chinese Patent Application No. 202280019199.5.
Communication issued on Nov. 28, 2025 by the Korean Ministry of Intellectual Property (MOIP) in Korean Patent Application No. 10-2021-0160166.

* cited by examiner

METHOD AND APPARATUS FOR ADJUSTING CONTROL PARAMETER VALUES OF WEARABLE DEVICE

CROSS-REFERENCE TO RELATED APPLICATION

This application is a continuation of International Application No. PCT/KR2022/007919 designating the United States, filed on Jun. 3, 2022, in the Korean Intellectual Property Receiving Office and claiming priority to Korean Patent Application No. 10-2021-0073671 filed on Jun. 7, 2021, and Korean Patent Application No. 10-2021-0160166 filed on Nov. 19, 2021, in the Korean Intellectual Property Office, the disclosures of which are incorporated herein by reference in their entireties.

BACKGROUND

1. Field

The disclosure relates to a wearable device, and more particularly, to a method and apparatus for outputting a torque to provide a force to a user and adjusting control parameter values of the wearable device.

2. Description of the Related Art

With the onset of aging societies, a growing number of people experience inconvenience and pain in walking from weakened muscular strength or joint problems due to aging, and there is growing interest in walking assist devices that enable the elderly with weakened muscular strength or patients with muscular joint discomfort to walk with ease.

SUMMARY

Example embodiments may address at least the above problems and/or disadvantages and other disadvantages not described above. Also, the example embodiments are not required to overcome the disadvantages described above, and an example embodiment may not overcome any of the problems described above.

According to an example embodiment of the disclosure, there is provided a method of adjusting a control parameter value performed by a wearable device, the method including: outputting a first torque value to a driver circuit configured to control the wearable device to apply a force to a portion of a body of a user while the user is wearing the wearable device, the first torque value being determined based on a first value of a control parameter, and the control parameter including at least one of magnitude information, output timing information, and sensitivity information; obtaining a first angular velocity of a first joint in the body of the user in association with the output of the first torque value; determining, based on the first angular velocity, a second value of the control parameter to change the first angular velocity of the first joint; outputting a second torque value to the driver circuit, the second torque value being determined based on the second value of the control parameter; obtaining a second angular velocity of the first joint in the body of the user in association with the output of the second torque value; and determining a final value of the control parameter based on the second value of the control parameter, based on a termination condition on optimization of the control parameter being satisfied after the second angular velocity is obtained; wherein the determining of the second value of the control parameter to change the first angular velocity of the first joint includes: re-determining the second value of the control parameter to change the first angular velocity of the first joint, based on the termination condition being not satisfied after the second angular velocity is obtained, wherein the termination condition includes at least one of whether a number of times of adjusting a value of the control parameter corresponds to a threshold number of adjustment, whether a number of strides of the user corresponds to a threshold number of strides, and a passage of time for adjusting the value of the control parameter corresponds to a threshold time.

According to an example embodiment of the disclosure, there is provided a non-transitory computer-readable storage medium storing a program that causes a processor to perform a method of adjusting a control parameter value performed by a wearable device, the method including: outputting a first torque value to a driver circuit configured to control the wearable device to apply a force to a portion of a body of a user while the user is wearing the wearable device, the first torque value being determined based on a first value of a control parameter, and the control parameter including at least one of magnitude information, output timing information, and sensitivity information; obtaining a first angular velocity of a first joint in the body of the user in association with the output of the first torque value; determining, based on the first angular velocity, a second value of the control parameter to change the first angular velocity of the first joint; outputting a second torque value to the driver circuit, the second torque value being determined based on the second value of the control parameter; obtaining a second angular velocity of the first joint in the body of the user in association with the output of the second torque value; and determining a final value of the control parameter based on the second value of the control parameter, based on a termination condition on optimization of the control parameter being satisfied after the second angular velocity is obtained; wherein the determining of the second value of the control parameter to change the first angular velocity of the first joint includes: re-determining the second value of the control parameter to change the first angular velocity of the first joint, based on the termination condition being not satisfied after the second angular velocity is obtained, wherein the termination condition includes at least one of whether a number of times of adjusting a value of the control parameter corresponds to a threshold number of adjustment, whether a number of strides of the user corresponds to a threshold number of strides, and a passage of time for adjusting the value of the control parameter corresponds to a threshold time.

According to an example embodiment of the disclosure, there is provided a wearable device including: a processor configured to control the wearable device; at least one sensor configured to measure a joint angle in a body of a user; a motor driver circuit configured to be controlled by the processor; a motor electrically connected to the motor driver circuit; and a support frame configured to transmit a torque output by the motor to a portion of the body of the user; wherein the processor is configured to: output a first torque value to the motor driver circuit to control the motor to apply a force to the portion of the body of the user through the support frame while the user is wearing the wearable device, the first torque value being determined based on a first value of a control parameter, and the control parameter including at least one of magnitude information, output timing information, and and sensitivity information; obtain a first angular velocity of a first joint in the body of the user in association with the output of the first torque value; determine, based on the first angular velocity, a second value of the control parameter to change the first angular velocity of the first joint; output a second torque value to the motor driver circuit, the second torque value being determined based on the second value of the control parameter; obtain a second angular velocity of the first joint in the body of the user in association with the output of the second torque value; determine a final value of the control parameter based on the second value of the control parameter, based on a termination condition on optimization of the control parameter being satisfied after the second angular velocity is obtained; and re-determine the second value of the control parameter to change the first angular velocity of the first joint based on the termination condition being not satisfied after the second angular velocity is obtained, wherein the termination condition includes at least one of whether a number of times of adjusting a value of the control parameter corresponds to a threshold number of adjustment, whether a number of strides of the user corresponds to a threshold number of strides, and a passage of time for adjusting the value of the control parameter corresponds to a threshold time.

According to an example embodiment of the disclosure, there is provided a wearable device including: a memory storing one or more instructions; and a processor configured to execute the one or more instructions to: output a first torque value to a driver circuit configured to control the wearable device to apply a force to at least a portion of a body of a user while the user is wearing the wearable device, the first torque value being determined based on a first value of a control parameter; obtain a first angular velocity of a first joint in the body of the user in association with the output of the first torque value; determine, based on the first angular velocity, a second value of the control parameter to change the first angular velocity of the first joint; output a second torque value to the driver circuit, the second torque value being determined based on the second value of the control parameter; obtain a second angular velocity of the first joint in the body of the user in association with the output of the second torque value; and determine a final value of the control parameter based on the second value of the control parameter, based on a termination condition on optimization of the control parameter being satisfied after the second angular velocity is obtained.

BRIEF DESCRIPTION OF THE DRAWINGS

The above and/or other aspects will be more apparent by describing certain example embodiments, taken in conjunction with the accompanying drawings, in which.

DETAILED DESCRIPTION

Figure 1A:
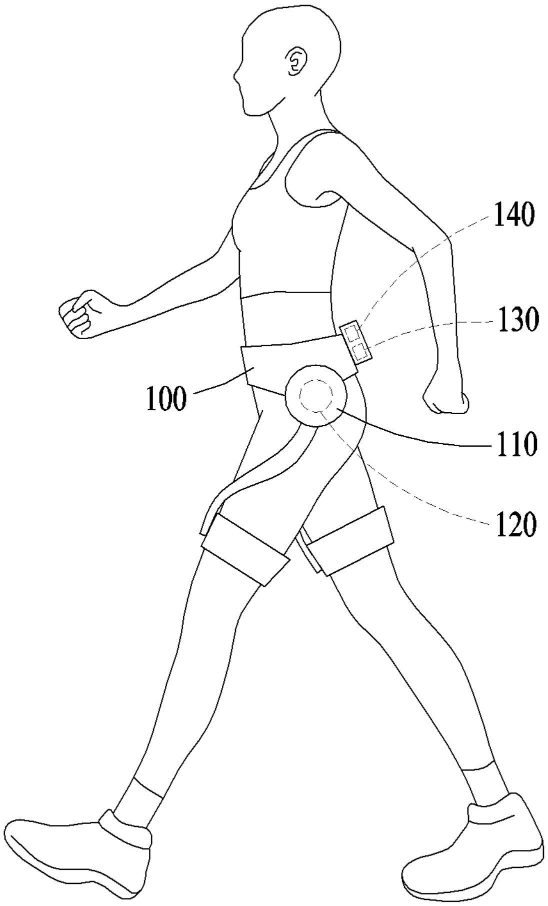
FIGS. 1A, 1B, 1C and 1D are diagrams illustrating an example of a wearable device according to an example embodiment.

Hereinafter, example embodiments will be described in detail with reference to the accompanying drawings, and like reference numerals in the drawings refer to like elements throughout. The following structural or functional descriptions of examples are merely intended for the purpose of describing the examples and the examples may be implemented in various forms. The examples are not meant to be limited, but it is intended that various modifications, equivalents, and alternatives are also covered within the scope of the claims.

FIGS. 1A, 1B, 1C and 1D are diagrams illustrating an example of a wearable device according to an example embodiment.

Referring to FIGS. 1A, 1B, 1C and 1D, a wearable device 100 is equipped to assist a gait of a user. For example, the wearable device 100 may be a device configured to assist the user in walking. Also, the wearable device 100 may be the device configured to assist the user in walking and be an exercise device configured to provide an exercise function by providing a resistive force to the user. The resistive force provided to the user may be, for example, a force actively applied to the user, such as, a force generated by a device (e.g., a motor). According to another example embodiment, the force may be a force impeding a movement of the user, such as a friction force, rather than the force being actively applied to the user. The resistive force may also be referred to as an exercise load.

Figure 1B:
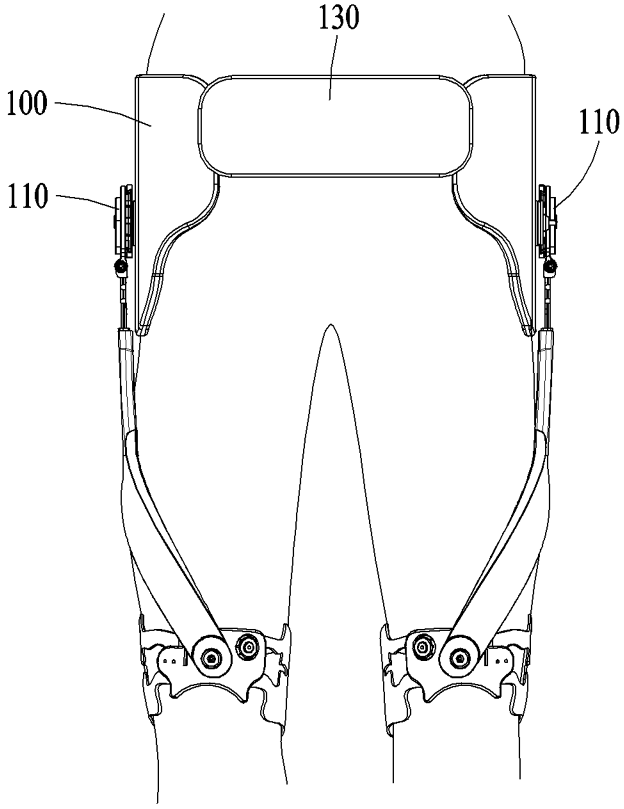

FIGS. 1A and 1B illustrates a hip type wearable device 100, but a type of a wearable device may not be limited to the hip type and may be a type that fully or partially supports the lower limb. That is, the wearable device may be of any one type that supports a part of the lower limb, for example, a part down to the knees and a part down to the ankles or supports a whole body.

Example embodiments described with reference to FIGS. 1A, 1B, 1C and 1D may be applicable to the hip type, but are not limited thereto, and may be applicable to different types of the wearable device.

According to an example embodiment, the wearable device 100 may include a driver 110, a sensor 120, an inertial measurement unit (IMU) 130, a controller 140, a battery 150, and a communication module 152. For example, the IMU 130 and the controller 140 may be provided in a main frame of the wearable device 100. For another example, the IMU 130 and the controller 140 may be included in a housing that is formed at or attached to the outside of the main frame of the wearable device 100.

Figure 1C:
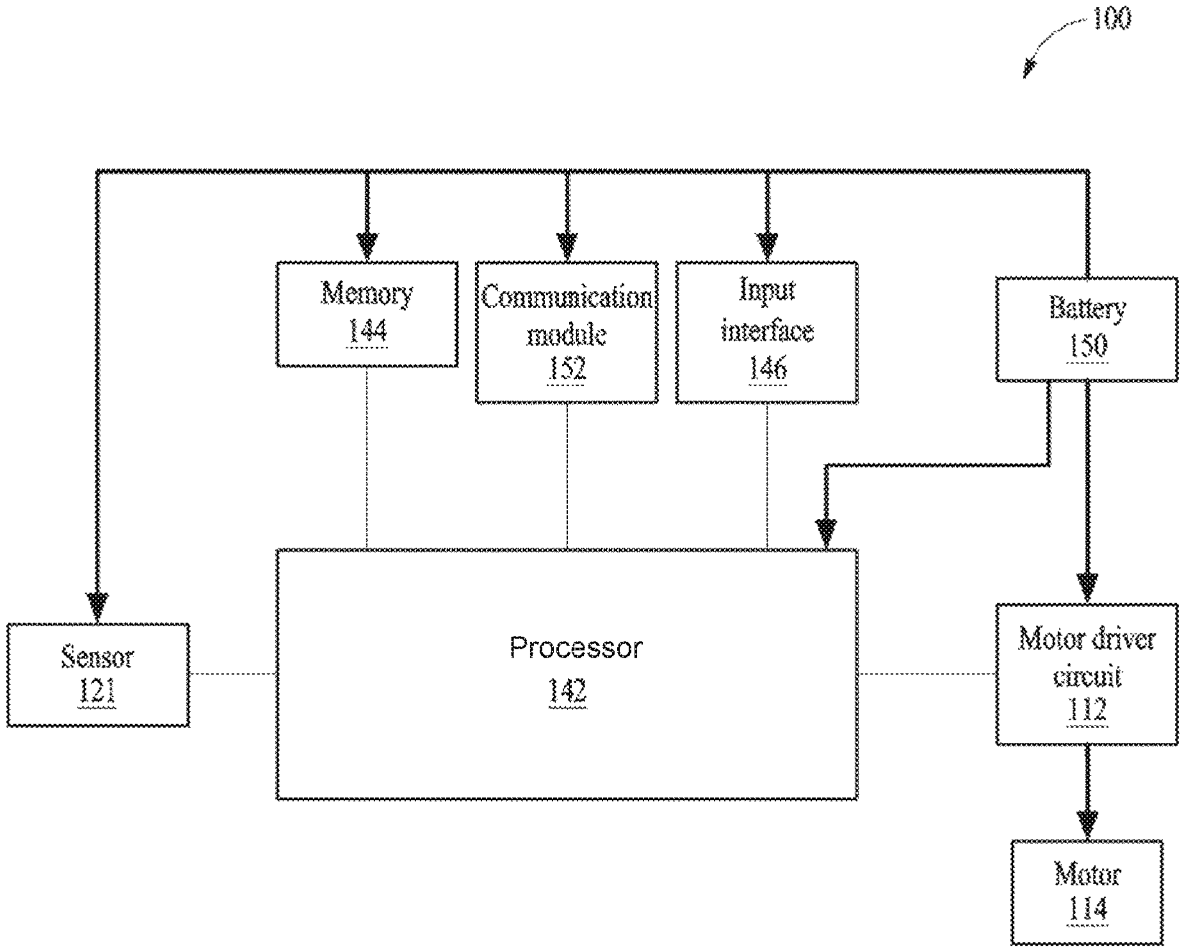
Figure 1D:
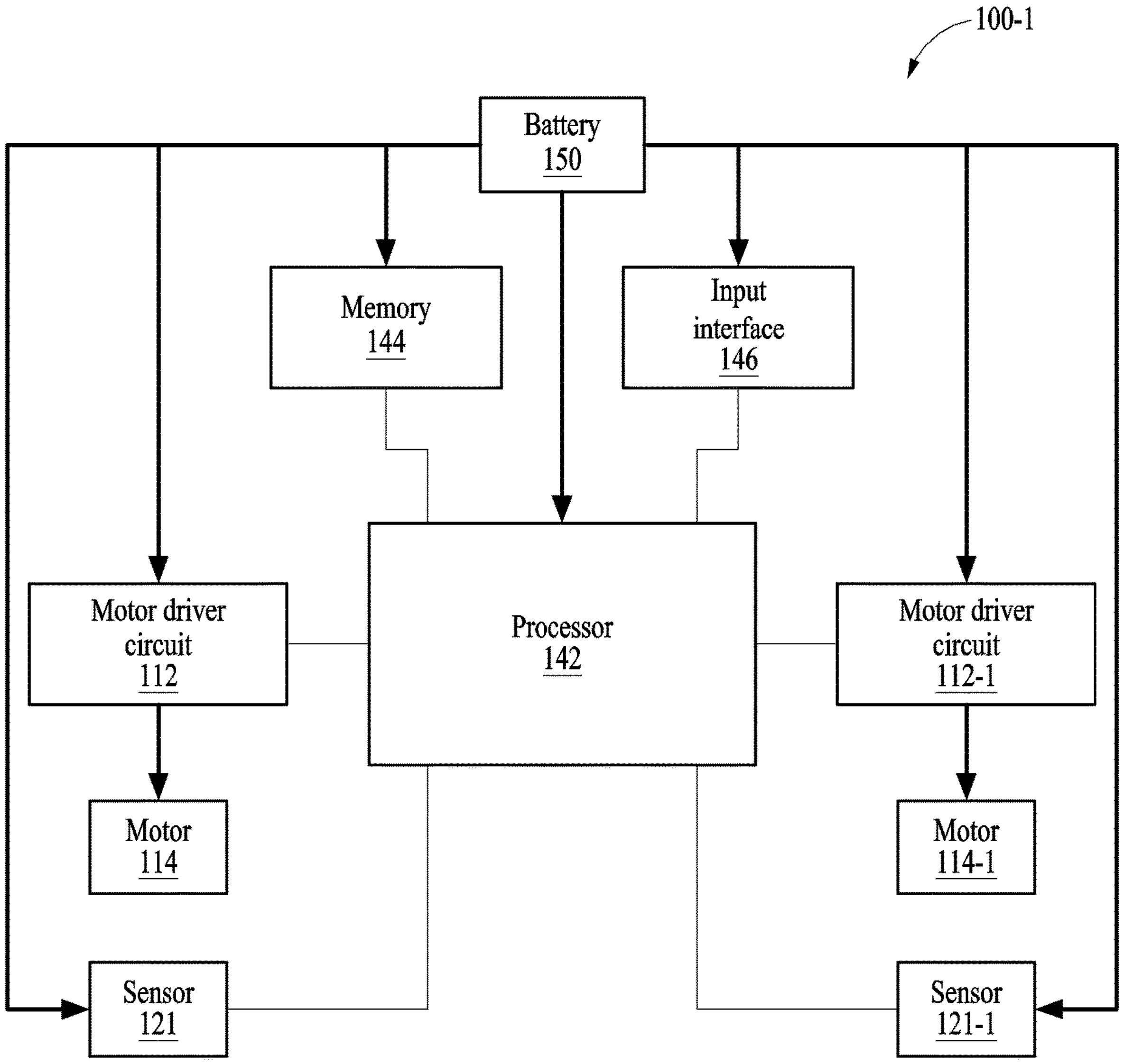

Referring to FIG. 1C, the driver 110 may include a motor 114 and a motor driver circuit 112 for driving the motor 114. The sensor 120 may include at least one sensor 121. The controller 140 may include a processor 142, a memory 144, and an input interface 146. Although, according to an example embodiment, the wearable device 100 is illustrated in FIG. 1C as including one sensor (e.g., the sensor 121), one motor driver circuit (e.g., the motor driver circuit 112), and one motor (e.g., the motor 114), examples are not limited thereto. According to another example embodiment, as illustrated in FIG. 1D, a wearable device 100-1 may include a plurality of sensors 121 and 121-1, a plurality of motor driver circuits 112 and 112-1, and a plurality of motors 114 and 114-1. Also, according to another example embodiment, the wearable device 100 may include a plurality of processors. The number of motor driver circuits, motors, or processors may vary according to a body part on which the wearable device 100 is worn, and the functionality of the wearable device.

The following descriptions of the sensor 121, the motor driver circuit 112, and the motor 114 may also be applicable to the sensor 121-1, the motor driver circuit 112-1, and the motor 114-1 illustrated in FIG. 1D.

The driver 110 may drive a hip joint of the user. For example, the driver 110 may be provided on a right hip or a left hip of the user. According to an example, embodiment, more than one driver 110 may be provided in the wearable device. For example, a first driver may be provided on a right hip and a second driver may be provided a left hip of the user. Moreover, the driver 110 may be provided additionally on knees and ankles of the user. The driver 110 may include the motor 114 for outputting a rotational torque and the motor driver circuit 112 for driving the motor 114.

The sensor 120 may measure a hip joint angle of the user while walking. The information on the hip joint angle sensed by the sensor 120 may include an angle of the right hip joint, an angle of the left hip joint, a difference between the angles of the two hip joints, and a hip joint motion direction. For example, the sensor 121 may be provided in the driver 110. Based on the position of the sensor 121, the sensor 120 may additionally measure a knee angle and an ankle angle of the user. The sensor 121 may be an encoder. The information on joint angles measured by the sensor 120 may be transmitted to the controller 140.

According to an example embodiment, the sensor 120 may include a potentiometer. The potentiometer may sense an R-axis joint angle, an L-axis joint angle, an R-axis joint angular velocity, and an L-axis joint angular velocity based on a walking motion of the user. R and L axes may be reference axes to right and left legs. For example, the R and L axes may be set to be vertical to the ground and set such that a front side of a body of a person has a negative value and a rear side of the body has a positive value.

The IMU 130 may measure acceleration information and pose information while walking. For example, the IMU 130 may sense acceleration on an X-axis, a Y-axis, and a Z-axis and an angular velocity on the X-axis, the Y-axis, and the Z-axis based on the walking motion of the user. The acceleration information and the pose information measured by the IMU 130 may be transmitted to the controller 140.

The wearable device 100 may detect a point at which a foot of the user is landed based on the acceleration information measured by the IMU 130.

According to an example embodiment, a pressure sensor may be provided on the sole of the foot of the user, and the pressure sensor may detect a point in time at which the foot is landed.

In addition to the sensor 120 and the IMU 130 described above, the wearable device 100 may include other sensors configured to sense a change in a quantity of motion of the user or a change in biosignal based on a walking motion of the user. The sensors may include an electromyogram (EMG) sensor, for example.

The controller 140 may control an overall operation of the wearable device 100. For example, the controller 140 may receive information sensed by each of the sensor 120 and the IMU 130. The information sensed by the IMU 130 may include acceleration information and pose information. The information sensed by the sensor 120 may include an angle of the right hip joint, an angle of the left hip joint, a difference between the angles of the two hip joints, and a hip joint motion direction. For example, the controller 140 may calculate the difference between the angles of both hip joints based on the angle of the right hip joint and the angle of the left hip joint. The controller 140 may generate a signal for controlling the driver 110 based on the sensed information. For example, the generated signal may be an assistive force for assisting the user in walking. For another example, the generated signal may be a resistive force for impeding the user in walking. The resistive force may be provided for an exercise of the user.

According to an example embodiment, the processor 142 of the controller 140 may control the driver 110 to provide a resistive force to the user. According to an example embodiment, the memory 144 may store one or more instructions or program codes, and the processor 142 may execute the one or more instructions or program codes to perform operations of the wearable device. For example, the processor 142 may execute one or more instructions or program codes to control the driver 110 to provide a resistive force to the user.

For example, the driver 110 may provide the resistive force to the user by applying an active force to the user through the motor 114. Alternatively, the driver 110 may provide the resistive force to the user by using back-drivability of the motor 114 without applying the active force to the user. The back-drivability of a motor may refer to responsiveness of a rotation axis of the motor to an external force. When the back-drivability increases, the motor may more readily respond to the external force acting on the rotation axis, that is, the rotation axis of the motor may more readily rotate. For example, although the same external force is applied to the rotation axis of the motor, a rotation of the rotation axis of the motor may vary according to the back-drivability.

According to another example embodiment, the driver 110 may provide the resistive force to the user by outputting a torque in a direction that impedes a movement of the user.

For example, the processor 142 of the controller 140 may control the driver 110 such that the driver 110 outputs a torque (or an assistive torque) for assisting the user in walking. For example, in the hip type wearable device 100, the driver 110 may be provided on each of a left hip portion and a right hip portion, and the controller 140 may output a control signal for controlling the driver 110 to output a torque.

The driver 110 may output a torque based on the control signal output by the controller 140. A torque value for generating the torque may be externally set or be set by the controller 140. For example, to represent a magnitude of the torque value, the controller 140 may use a magnitude of a current for a signal transmitted to the driver 110. That is, when the magnitude of the current received by the driver 110 increases, the torque value may also increase. For another example, the processor 142 of the controller 140 may transmit the control signal to the motor driver circuit 112 of the driver 110, and the motor driver circuit 112 may control the motor 114 by generating a current corresponding to the control signal.

The battery 150 may supply power to the components of the wearable device 100. The wearable device 100 may further include a circuit (e.g., a power management integrated circuit (PMIC)) configured to convert power of the battery 150 to match an operating voltage of the components of the wearable device 100 and provide it to the components of the wearable device 100. In addition, the battery 150 may or may not supply power to the motor 114 based on an operation mode of the wearable device 100.

According to an example embodiment, the wearable device 110 may include a thigh support frame configured to be attached to or combined with at least a portion of a thigh of the user. The thigh support frame may be connected to the main frame through the driver 110. The thigh support frame may transmit a torque output by the motor 114 to at least a portion of the lower limb (e.g., a part of the thigh) of the user. For example, when the motor 114 of the driver 110 outputs the torque, the thigh support frame may rotate around the motor 114. The rotation of the thigh support frame around the motor 114 may assist or impede the motion of lifting or lowering the thigh connected to the thigh support frame.

The communication module 152 may support the establishment of a direct (or wired) communication channel or a wireless communication channel between the wearable device 100 and an external electronic device, and support communication through the established communication channel. The communication module 152 may include one or more communication processors configured to support direct (or wired) communication or wireless communication. The communication module 152 may include a wireless communication module (e.g., a cellular communication module, a short-range wireless communication module, or a global navigation satellite system (GNSS) communication module) or a wired communication module (e.g., a local area network (LAN) communication module or a power line communication (PLC) module). A corresponding one of these communication modules may communicate with the external electronic device via a first network (e.g., a short-range communication network such as Bluetooth, wireless-fidelity (Wi-Fi) direct, or infrared data association (IrDA)) or a second network (e.g., a legacy cellular network, a 5G network, a next-generation communication network, the Internet, or a computer network). These different types of communication modules may be integrated into a single component (e.g., a single chip) or be implemented as a plurality of separate components (e.g., multi chips).

Figure 2:
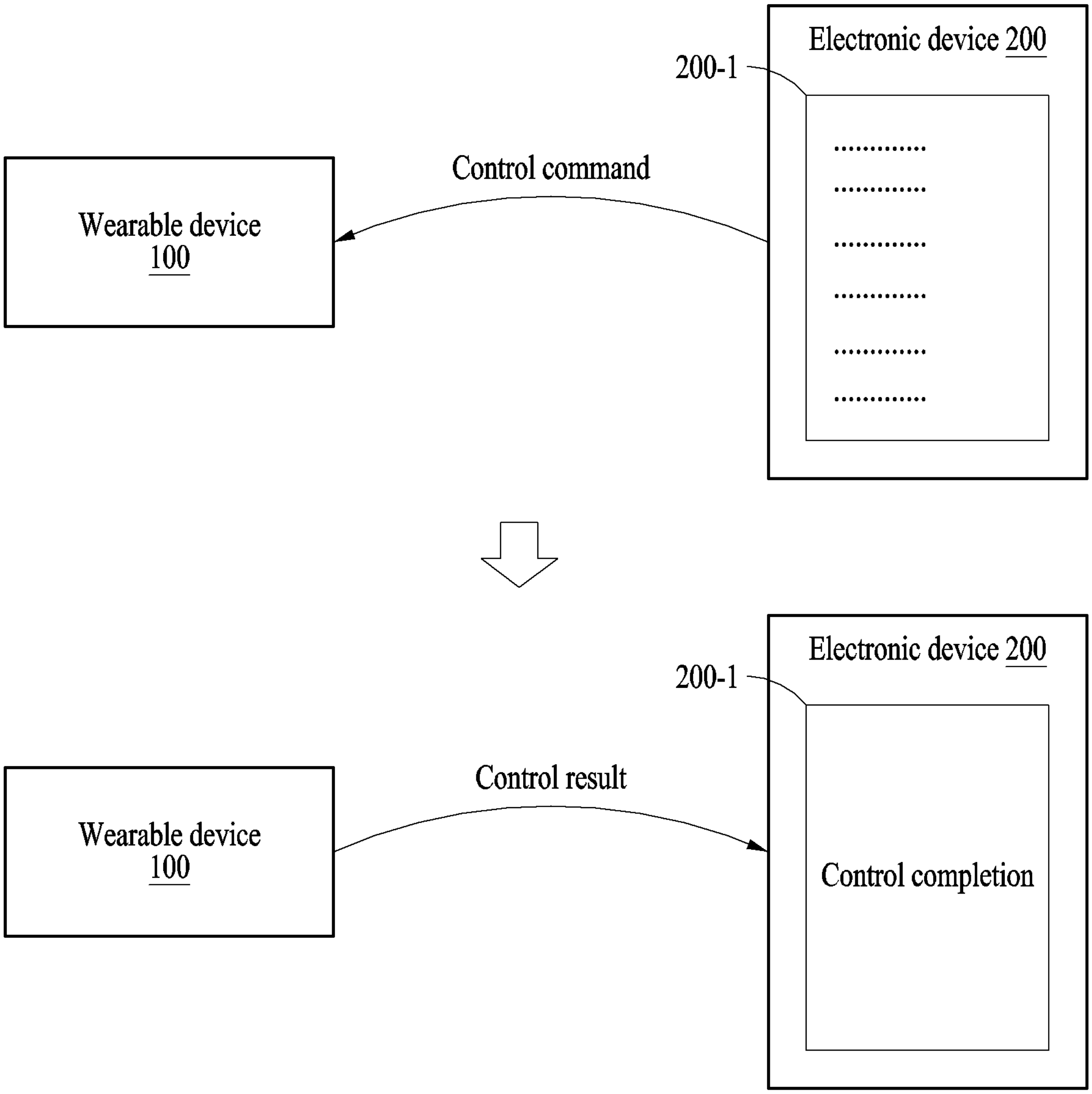
FIG. 2 is a diagram illustrating an example of a wearable device communicating with an electronic device according to an example embodiment.

FIG. 2 is a diagram illustrating an example of a wearable device communicating with an electronic device according to an example embodiment.

Referring to FIG. 2, the wearable device 100 may communicate with an electronic device 200. The electronic device 200 may include, for example, a smartphone, a tablet, a smartwatch, eyeglasses, and the like, but is not limited to the foregoing examples. For example, the electronic device 200 may be an electronic device of a user of the wearable device 100. For another example, the electronic device 200 may be an electronic device of a trainer who guides the user wearing the wearable device 100.

According to implementation, the wearable device 100 and the electronic device 200 may communicate via a server through short-range wireless communication or cellular mobile communication.

The electronic device 200 may display a user interface (UI) for controlling an operation of the wearable device 100 on a display 200-1. The UI may include, for example, at least one soft key through which the user may control the wearable device 100.

The user may input a command for controlling the operation of the wearable device 100 through the UI on the display 200-1 of the electronic device 200, and the electronic device 200 may generate a control command corresponding to the command and transmit the generated control command to the wearable device 100. The wearable device 100 may operate according to the received control command and transmit a control result to the electronic device 200. The electronic device 200 may display a control completion message on the display 200-1 of the electronic device 200.

Figure 3:
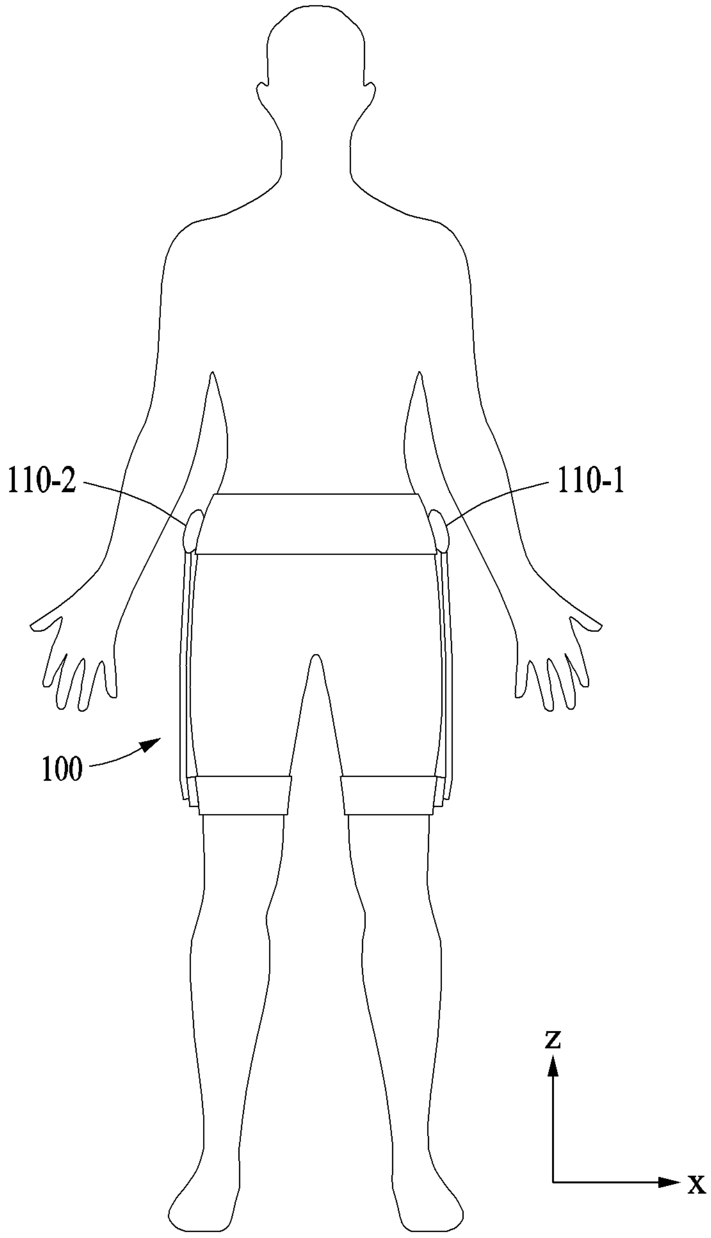
FIGS. 3 and 4 are diagrams illustrating an example of a wearable device according to an example embodiment.
Figure 4:
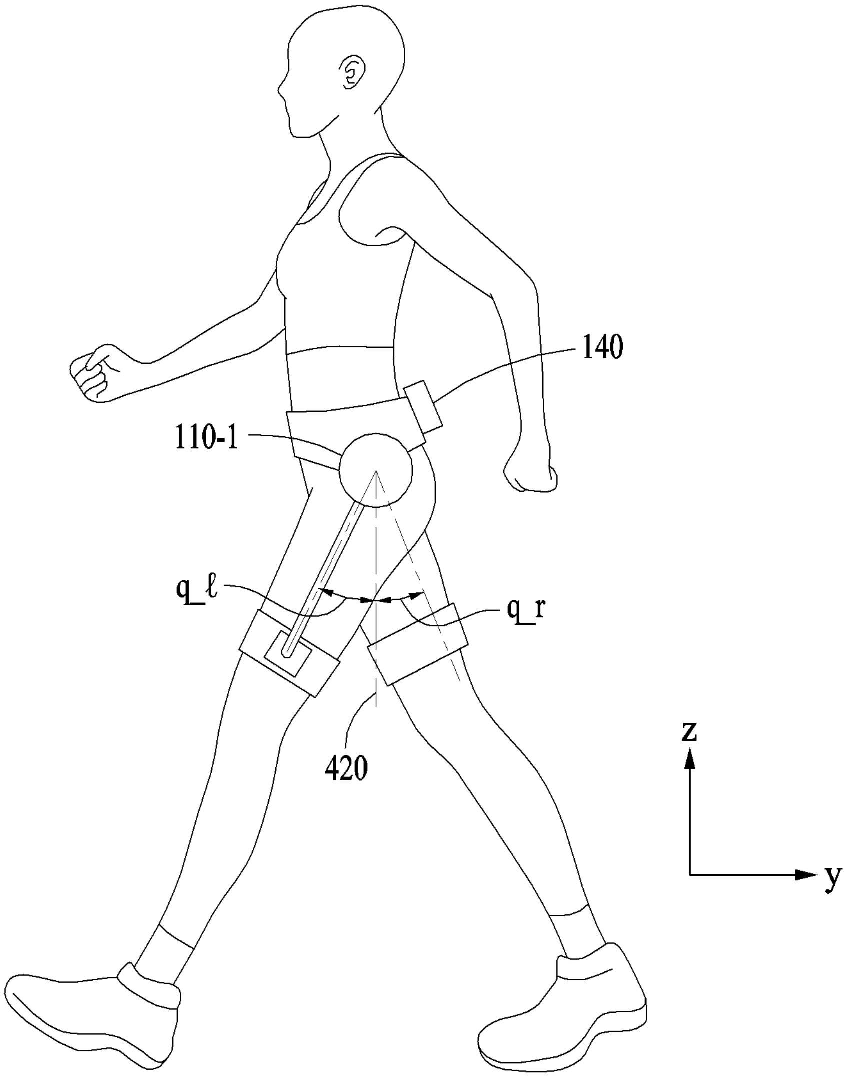

FIGS. 3 and 4 are diagrams illustrating an example of a wearable device according to an example embodiment.

Referring to FIGS. 3 and 4, drivers 110-1 and 110-2 of the wearable device 100 of FIGS. 1A, 1B, 1C and 1D may be provided around a hip joint of a user, and the controller 140 of the wearable device 100 may be provided around a waist of the user. The positions of the drivers 110-1 and 110-2 and the controller 140 are not limited to the example positions illustrated in FIGS. 3 and 4, and as such, according to another example embodiment, the drivers 110-1 and 110-2 and the controller 140 may be provided at a different position.

The wearable device 100 may measure (or sense) a left hip joint angle q_l and a right hip joint angle q_r of the user. For example, the wearable device 100 may measure the left hip joint angle q_l of the user through a left encoder and measure the right hip joint angle q_r of the user through a right encoder. As illustrated in FIG. 4, the left hip angle q_l may be a negative number because a left leg of the user is before a reference line 420, and the right hip angle q_r may be a positive number because a right leg of the user is behind the reference line 420. However, the disclosure is not limited thereto, and as such, according to another example embodiment, the right hip joint angle q_r may be a negative number when the right leg is before the reference line 420, and the left hip joint angle q_l may be a positive number when the left leg is behind the reference line 420. Similarly, a negative number for the leg swing speed (i.e., negative rad/s) may be provided to indicate a leg of the user that is before a reference line 420, and a positive number for the leg swing speed (i.e., positive rad/s) may be provided to indicate a leg of the user that is behind a reference line 420.

According to an example embodiment, the wearable device 100 may determine a torque value $\tau(t)$ based on the left hip joint angle q_l, the right hip joint angle q_r, a gain $\kappa$ and a delay $\Delta t$, and control the motor driver circuit 112 of the wearable device 100 to output the determined torque value $\tau(t)$. A force provided to the user by the torque value $\tau(t)$ may be referred to as force feedback. For example, the wearable device 100 may determine the torque value $\tau(t)$ based on Equation 1.

$$y = \sin(q\_r) - \sin(q\_l) \qquad \text{[Equation 1]}$$

$$\tau(t) = \kappa y(t - \Delta t)$$

In Equation 1, y denotes a state factor, and q_r denotes a right hip joint angle, and q_l denotes a left hip joint angle. According to Equation 1, the state factor y may indicate a distance between two legs. For example, y being 0 may indicate a state (e.g., a crossing state) in which the distance between the legs is 0, and an absolute value of y being maximum may indicate a state (e.g., a landing state) in which an angle between the legs is maximum. When q_r and q_l are measured at time t, the state factor y may be expressed as y(t).

The gain κ is a parameter that represents the magnitude and direction of an output torque. As the magnitude of the gain κ increases, a greater torque may be output. When the gain κ is negative, a torque that acts as a resistive force may be output to the user. When the gain κ is positive, a torque that acts as an assistive force may be output to the user. The delay Δt is a parameter in association with torque output timing. According to an example embodiment, a gain κ value and a delay Δt value may be preset and be adjustable by the user or the wearable device 100.

Figure 5A:
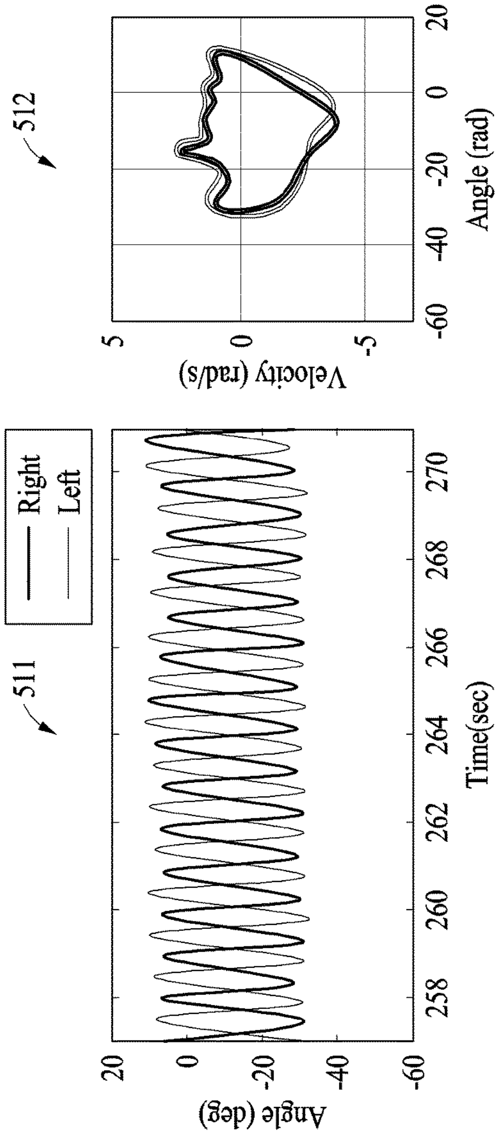
FIG. 5A is a diagram illustrating an example of a slow and short gait pattern and FIG. 5B is a diagram illustrating an example of a fast and dynamic gait pattern according to an example embodiment.
Figure 5B:
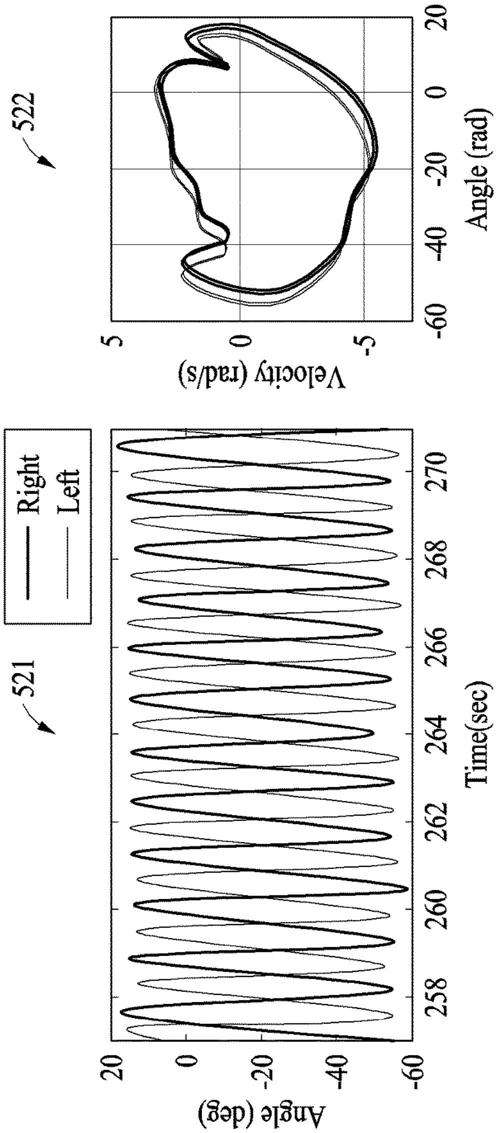

FIG. 5A is a diagram illustrating an example of a slow and short gait pattern and FIG. 5B is a diagram illustrating an example of a fast and dynamic gait pattern according to an example embodiment.

According to an example embodiment, a user who has weakened muscular strength or experiences a disease may walk with slow and short steps. FIG. 5A illustrates hip joint angles of the user with slow and short steps. A graph 511 represents trajectories of hip joint angles of the user with time, and a graph 512 represents a leg swing speed with respect to each of the hip joint angles. As illustrated in the graphs 511 and 512, a maximum angle at which the user steps forward is less than −40 degrees (°) and the leg swing speed is no greater than −5 radian per second (rad/s). A pattern of a gait having a small maximum hip joint angle and a low leg swing speed while walking may be assessed to have low gait agility.

According to an example embodiment, a healthy user may have a dynamic gait. FIG. 5B illustrates hip joint angles of the healthy user having the dynamic gait with fast and wide steps. A graph 521 represents trajectories of hip joint angles of the healthy user with time, and a graph 522 represents a leg swing speed with respect to each of the hip joint angles. As illustrated in the graphs 521 and 522, a maximum angle at which the healthy user steps forward is near −60° and the leg swing speed is greater than −5 rad/s. A pattern of a gait having a great maximum hip joint angle and a high leg swing speed while walking may be assessed to have high gait agility. In graphs 512 and 522, a negative number for the leg swing speed (i.e., negative rad/s) may be provided to indicate a leg of the user that is before a reference line 420, and a positive number for the leg swing speed (i.e., positive rad/s) may be provided to indicate a leg of the user that is behind a reference line 420.

A treadmill and devices for measuring metabolizable energy may be required to measure agility of a user. However, gait agility of the user may be more easily assessable by defining, as a new measuring indicator for gait, a gait power value generated by the user compared to a torque provided to the user while walking. The gait agility defined as above may be used in the process of personalizing the wearable device 100 configured to output a torque to assist the user in walking.

Every user has a different gait pattern with a maximum hip joint angle and a leg swing speed, and therefore, the magnitude and timing of torque output may need to be desirably controlled according to a gait pattern of a user such that the wearable device 100 may desirably assist the user in walking. The magnitude and timing of a torque may be controlled by adjusting a gain parameter value and a delay parameter value. When the gain parameter value and the delay parameter value are desirably adjusted, the user may feel comfortable in walking and the gait pattern of the user may become more dynamic.

When the wearable device 100 is not personalized for the user, the wearable device 100 may not provide a desirable magnitude and timing of a torque to the user. To personalize the wearable device 100, the user may perform a test walk while wearing the wearable device 100, and the wearable device 100 may determine parameter values desirable for a gait of the user through the test walk.

The wearable device 100 may use a gait agility value as an assessment indicator to determine a gait pattern or a gait style of the user. For example, a gait agility value may be determined based on a hip joint angle, a hip joint angular velocity, and a magnitude of a torque output by the wearable device 100 while walking.

According to an example embodiment, the magnitude and timing of a torque output by the wearable device 100 may be constantly adjusted in the process of the personalization through the test walk while wearing the wearable device 100. a gait agility value When the magnitude and timing of the output torque is uncomfortable for the user, the gait agility value for a corresponding gait may be reduced. When the magnitude and timing of the output torque is comfortable for the user, the gait agility value for a corresponding gait may be maximized. When the gait agility value no longer increases despite repeated gaits, the output torque and the timing may be assessed as being optimized.

According to example embodiments, adjusting parameter values used for controlling the wearable device 100 based on a gait agility value will be described further with reference to FIGS. 6 through 13.

Figure 6:
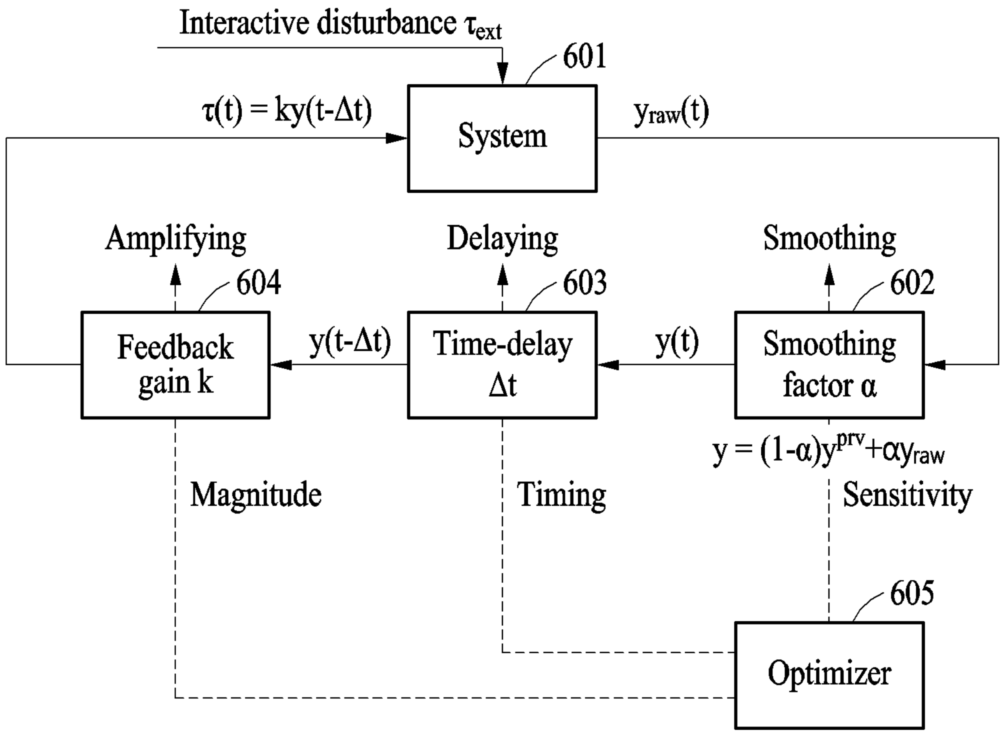
FIG. 6 is a diagram illustrating an example of a method of optimizing a parameter value of a wearable device according to an example embodiment.

FIG. 6 is a diagram illustrating an example of a method of optimizing a parameter value of a wearable device according to an example embodiment. According to an example embodiment, the optimization may be performed by an optimizer 605. According to an example embodiment, the optimizer may be implemented by a processor, such as processor 142.

According to an example embodiment, the wearable device 100 may determine a parameter value for at least one of sensitivity 602, a delay 603 and a gain 604 related to a torque output from a system 601 during a test walk of a user. The parameter value may be constantly adjusted during the test walk. A parameter for at least one of sensitivity, a gain, and a delay in association with the output torque may be referred to as a control parameter. According to an example embodiment, the system 601 may include a sensor, motor driver circuit and a motor. However, the disclosure is not limited thereto, and as such, components may be added or removed from the system 601.

According to an example embodiment, the wearable device 100 may obtain a first angle and a second angle by filtering a first raw angle (e.g., q_r_raw) of a first joint (e.g., a right hip joint) and a second raw angle (e.g., q_l_raw) of a second joint (e.g., a left hip joint) that are measured by the sensor 120. For example, the wearable device 100 may filter the first raw angle and the second raw angle based on a first previous angle and a second previous angle that are measured at a previous time.

The wearable device 100 may determine a first state factor based on the first angle and the second angle. A state factor may be filtered to reduce a sense of inconvenience felt by the user. For example, the wearable device 100 may determine an initial state factor $y_{raw}(t)$ at a current time t based on the first angle and the second angle and determine a first state factor y(t) based on a previous state factor $y^{prv}$ determined at a previous time t−1 and the initial state factor $y_{mw}(t)$. The current time t may be processing time for $t^{th}$ data (or sample), and the previous time t−1 may be processing time for $t-1^{th}$ data. For example, a difference between the current time t and the previous time t−1 may be a time interval of an operation of generating or processing the data by a processor.

According to an example embodiment, a may be a parameter value that represents sensitivity 602. For example, a sensitivity value may be constantly adjusted during the test walk, but the sensitivity value may be preset to a predetermined value to reduce calculation complexity. According to the example embodiment, a may be a smoothing factor that represents sensitivity.

According to an example embodiment, the wearable device 100 may determine a first torque value by applying a first gain value 604 and a first delay value 603 as parameter values determined for the first state factor y(t), as represented by Equation 2.

$$\tau_l(t) = \kappa y(t - \Delta t)$$
$$\tau_r(t) = -\kappa y(t - \Delta t) \quad \text{[Equation 2]}$$

The calculated first torque value may need to be applied to both legs and may thus include a value for the first joint and a value for the second joint. For example, $\tau_l(t)$ may be a value for a left hip joint that is the second joint, and $\tau_r(t)$ may be a value for a right hip joint that is the first joint. According to an example embodiment, $\tau_e(t)$ and $\tau_r(t)$ may be values that have the same magnitude but opposite torque directions. The wearable device 100 may control the motor driver circuit 112 of the wearable device 100 to output a torque corresponding to the first torque value.

Figure 7A:
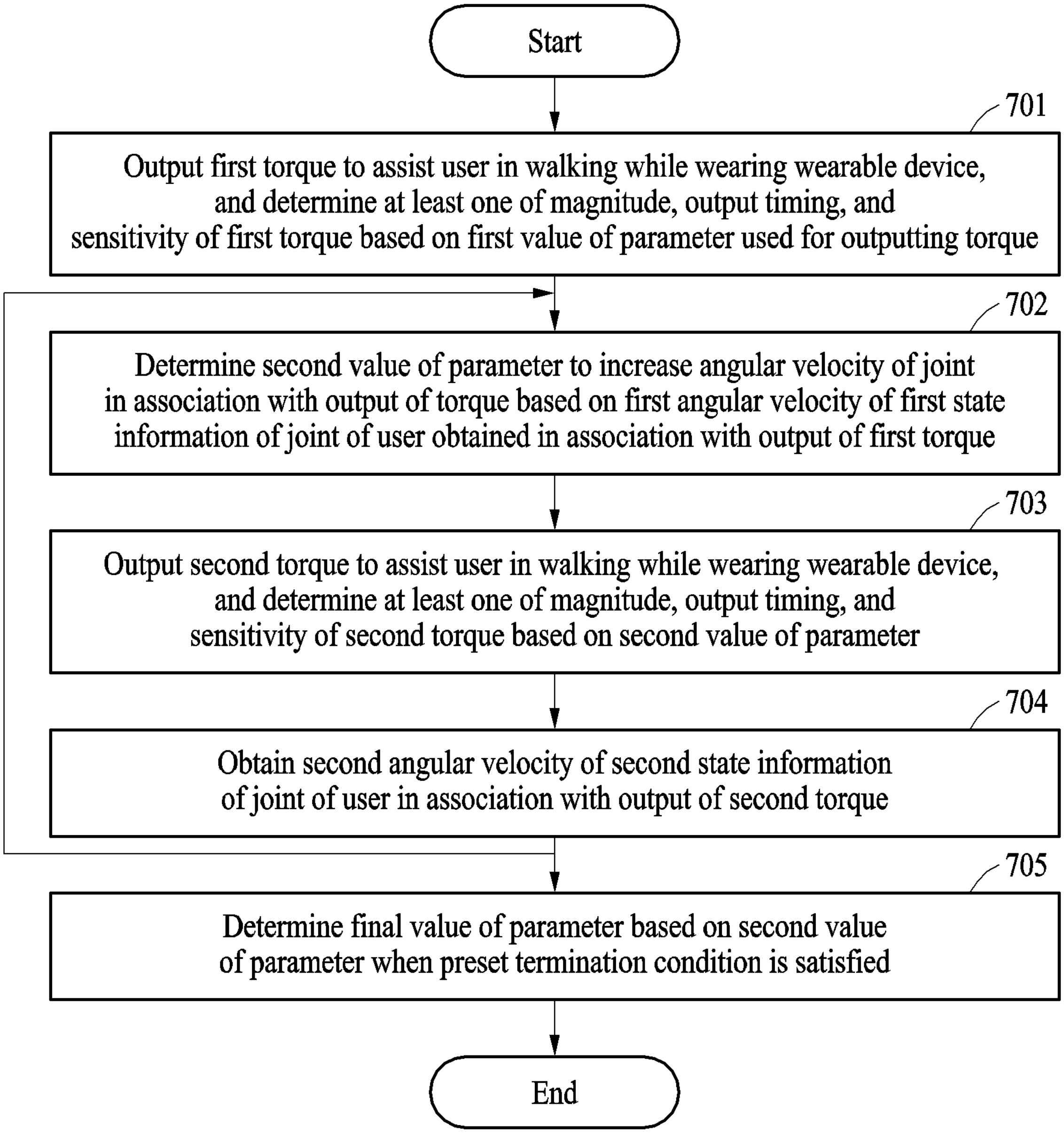
FIG. 7A is a flowchart illustrating an example of a method of adjusting a parameter value of a wearable device according to an example embodiment.

FIG. 7A is a flowchart illustrating an example of a method of adjusting a parameter value of a wearable device according to an example embodiment.

According to an example embodiment, the following operations 701 through 705 may be performed by the controller 140 of the wearable device 100. For example, the operations 701 through 705 may be performed by the processor 142 of the controller 140. A user may wear the wearable device 100 and perform a test walk. While the test walk is performed, operations 701 through 705 may be performed to personalize the wearable device 100 for the user. That is, when the personalization of the wearable device 100 is completed, optimized values may be determined for control parameters of the wearable device 100 for the user.

In operation 701, the processor 142 may output a first torque to assist the user in walking while wearing the wearable device 100. For example, at least one of the magnitude, output timing, and sensitivity of the first torque may be determined based on a first value of a parameter used for outputting a torque. The parameter used for outputting the torque may be a control parameter.

According to an example embodiment, the user may perform a test walk for a first hour, and for the first hour, a plurality of torques including the first torque may be output for the test walk. Sensitivity, magnitude, and output timing of each of the torques may be determined based on a value of a parameter (e.g., a gain, a delay, or sensitivity) used for outputting the corresponding torque. For example, parameter values for the torques for the first hour may be values in a first group (or a first generation).

According to an example embodiment, the processor 142 may output the first torque onto at least a portion of the lower limb of the user wearing the wearable device 100. For example, the processor 142 may output, to a joint of the user, the first torque that enables the user to bend or stretch the joint by controlling a motor provided around a hip joint, a knee joint, and/or an ankle joint of the user. In a walking mechanism in which joints are naturally stretched, a torque to stretch the joints may be an assistive torque and a torque that impedes the joints in stretching may be a resistive torque.

Outputting the first torque will be described in detail in conjunction with operation 710 to be described hereinafter with reference to FIG. 7B.

In operation 702, the processor 142 may determine a second value of a control parameter to increase an angular velocity of the joint in association with output of a torque, based on a first angular velocity of the joint of the user that is obtained in association with the output of the first torque. For example, the processor 142 may obtain the first angular velocity of the joint of the user in association with the output of the first torque and determine the second value of the control parameter to increase the angular velocity of the first joint in association with the torque output based on the obtained first angular velocity.

According to an example embodiment, the processor 142 may calculate a first gait agility value that represents gait agility of the user in association with the first torque based on the first angular velocity of the joint of the user. The gait agility value may be a parameter defined to numerically represent gait agility of the user. The gait agility of the user may be measured based on the gait agility value. For example, the first gait agility value may be a joint angular velocity. For another example, the first gait agility value may be a result of an equation or a function (e.g., an objective function) for calculating a gait agility value of which the joint angular velocity is used as an input factor. In this example in which the gait agility value is calculated through an equation or a function, when the joint angular velocity increases, the gait agility value based thereon may also tend to increase. Calculating the gait agility value of which input factor is the joint angular velocity will be described further with reference to FIG. 7B.

According to an example embodiment, when a torque is output to assist the user in walking with ease, a gait of the user may change to be dynamic, and the dynamicity of the gait may be represented by an increase in an angular velocity of a joint (e.g., a hip joint). The processor 142 may obtain, as first state information, an angle or an angular velocity of the joint at a point in time at which the first torque is output through a sensor (e.g., an encoder) provided on the joint. Obtaining the first state information of a joint will be described in detail in conjunction with operation 720 to be described hereinafter with reference to FIG. 7B.

According to an example embodiment, the processor 142 may determine a second value of a parameter used for outputting a torque such that a joint angular velocity of the user may increase in association with the output torque. For example, the processor 142 may determine the second value based on a first value of the parameter. According to another example embodiment, as the second value, parameter values in a second group may be determined based on parameter values in a first group.

According to an example embodiment, when a joint angular velocity represents a gait agility value, the second value of the parameter may be determined such that the joint angular velocity as the gait agility value may increase.

According to an example embodiment, when the gait agility value is calculated through an equation or a function of which an input factor is the joint angular velocity, the second value of the parameter may be determined such that the gait agility value may increase.

In operation 703, the processor 142 may output a second torque to assist walking while wearing the wearable device 100. For example, at least one of sensitivity, magnitude, and output timing of the second torque may be determined based on the second value of the parameter.

According to an example embodiment, the processor 142 may output the second torque to at least a portion of the lower limb of the user wearing the wearable device 100. For example, at least a portion of the lower limb of the user onto which the second torque is output may be the same as the portion to which the first torque is output. For example, the processor 142 may output the second torque by controlling the motor 114 provided on the hip joint of the user.

According to an example embodiment, the user may perform a test walk for a second hour after the first hour of operation 701, and a plurality of torques may be output for the test walk including the second torque for the second hour. For example, parameter values for the torques for the second hour may be values in the second group (or a second generation).

In operation 704, the processor 142 may obtain a second angular velocity of second state information of the joint of the user in association with output of the second torque. For a detailed description of operation 704, reference may be made to the description of operation 702.

According to an example embodiment, when the joint angular velocity represents the gait agility value, the second angular velocity of the joint as the gait agility value may be obtained as the second gait agility value.

According to an example embodiment, when the gait agility value is calculated through the equation or function of which the joint angular velocity is used as an input factor, the second gait agility value may be calculated based on the second angular velocity of the joint.

In operation 705, when a termination condition on parameter optimization is satisfied, the processor 142 may determine a final value for the parameter based on the second value of the parameter. The final value may be a value optimized for the user. Determining the final value for the parameter will be described further with reference to FIGS. 11, 12 and 13.

According to an example embodiment, when the termination condition on parameter optimization is not satisfied, operations 702, 703, 704 may be performed repeatedly. For example, when the termination condition is not satisfied after operation 704 is performed, operation 702 may be reperformed. In operation 702, when the termination condition is not satisfied after the second angular velocity is calculated, the processor 142 may redetermine the second value of the control parameter such that a gait agility value calculated based on a joint angular velocity or an angular velocity in association with an output torque may increase. A value of the parameter optimized for the user may be determined through the repeated performing of operations 702 through 704.

Figure 7B:
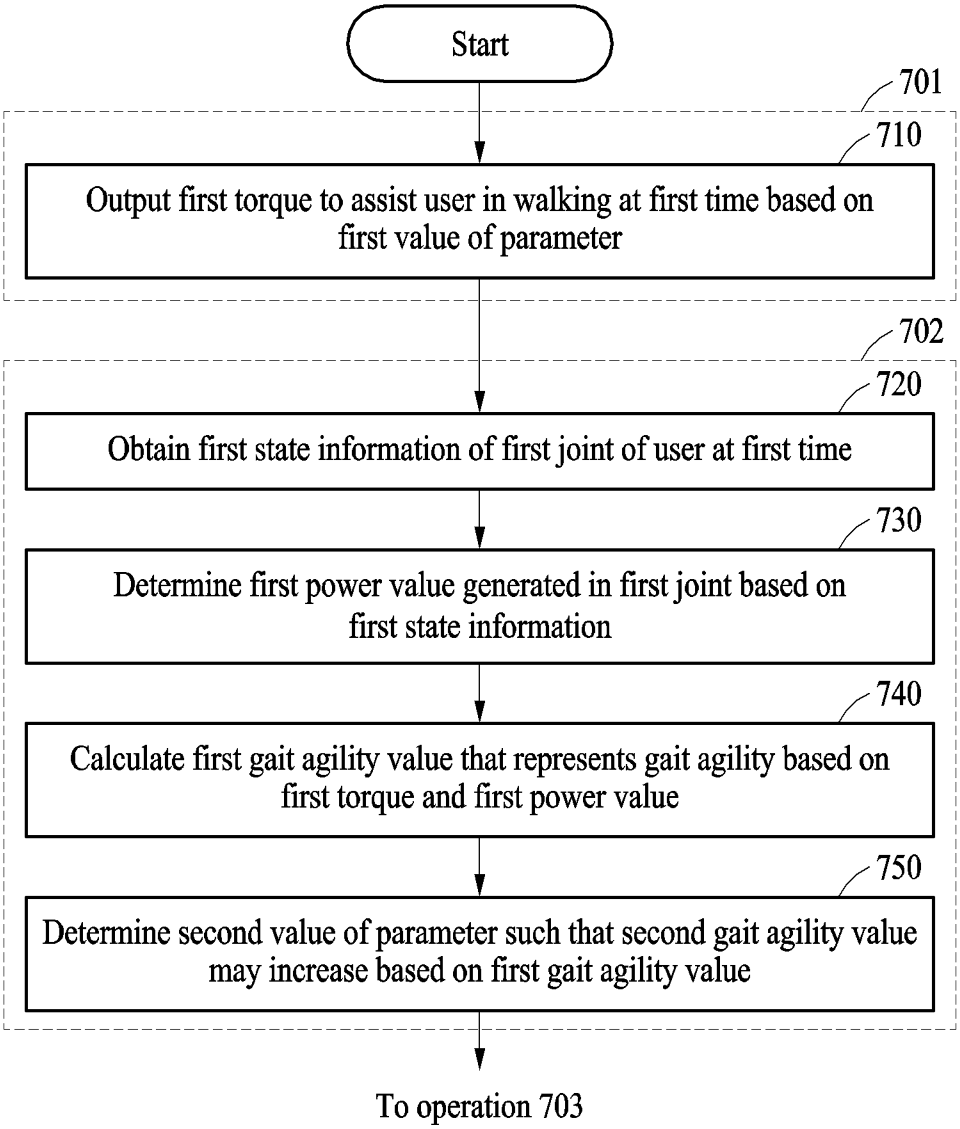
FIG. 7B is a flowchart illustrating an example of a method of adjusting a second value of the parameter of a wearable device according to an example embodiment.

FIG. 7B is a flowchart illustrating an example of a method of adjusting a second value of the parameter of a wearable device according to an example embodiment.

According to an example embodiment, operation 701 described above with reference to FIG. 7A may include the following operation 710.

In operation 710, the processor 142 may output a first torque for assisting a user in walking at a first time based on a first value of a parameter. For example, the first value of the parameter may be an initial value of a preset parameter. The first value of the parameter may include at least one of a first gain value, a first delay value, and/or a first sensitivity value. Outputting the first torque will be described further with reference to FIG. 8.

For example, the first value of the parameter may be a one-dimension (1D) value that includes only one of the first gain value, the first delay value, and the first sensitivity value. When the first value of the parameter is the 1D value, optimization of a corresponding parameter value may be performed faster than optimization of a two-dimensional (2D) value or a three-dimensional (3D) value. For example, the first value of the parameter may indicate the first gain value, and the optimization of a gain value may be performed through operations 701 through 705.

According to another example embodiment, the first value of the parameter may be a 2D value that includes two of the first gain value, the first delay value, and the first sensitivity value. An example where the first value of the parameter is the 2D value including the first gain value and the first delay value will be described further with reference to FIGS. 9, 10, 11 and 12.

According to another example embodiment, the first value of the parameter may be a 3D value that includes all of the first gain value, the first delay value, and the first sensitivity value. When the first value of the parameter is the 3D value, an optimization speed may be slower than that in the case of the first value of the parameter being the 1D value and the 2D value. However, in this case, parameter values optimized for a gait of the user may be determined.

According to an example embodiment, the first value of the parameter may be a set of parameter values of a first generation (or a first group). A set of parameter values of each generation may include a plurality of sub-parameter values. For example, a first sub-parameter value in a set of parameter values may include the first gain value, the first delay value, and the first sensitivity value. For example, the set of parameter values of each generation may be applied to the wearable device 100 for a preset period (e.g., the first hour of operation 701), and then a set of parameter values of a next generation may be applied to the wearable device 100 for a subsequent period (e.g., the second hour of operation 704) after the period is ended. For example, the preset period may be a preset number of strides. The set of parameter values of each generation will be described further with reference to FIG. 9.

According to an example embodiment, the term "generation" is defined to distinguish a phase of repeated adjustments of parameter values used for optimizing the parameter values. For example, parameter values included in a second generation may be improved overall compared to the parameter values included in the first generation. That is, parameter values of a next generation (e.g., the second generation) may be more optimized for a user than parameter values of a previous generation (e.g., the first generation). However, to prevent the parameter values from being optimized undesirably, a portion of the parameter values included in the second generation may be less improved parameter values than the parameter values included in the first generation.

The processor 142 may output the first torque for assisting the user in walking at the first time based on the set of the parameter values of the first generation. For example, the first torque may be output at the first time based on first sub-parameter values of the first generation, and a second torque may be output at a second time based on second sub-parameter values of the first generation. The first time and the second time may be included in the first time of operation 701.

According to an example embodiment, the processor 142 may output the first torque onto at least a portion of a lower limb of the user. For example, the processor 142 may output the first torque that allows joints of the user to bend or stretch by controlling the motor 114 provided around a hip joint, a knee joint, and/or an ankle joint of the user, for example.

Operation 702 described above with reference to FIG. 7A may include the following operations 720 through 750.

In operation 720, the processor 142 may obtain first state information of a first joint (e.g., a hip joint) of the user at the first time. The first state information of the first joint may include at least one of a joint angle and a joint angular velocity. For example, the first joint may be a joint corresponding to at least a portion of the lower limb onto which the first torque is output.

According to an example embodiment, the sensor 120 (or an encoder) provided around a joint of the user may sense a joint angle, and the processor 142 may obtain the joint angle sensed by the sensor 120. The sensed joint angle may be in association with a timestamp of the sensing time. For example, the processor 142 may calculate a joint angular velocity at the first time based on the sensed joint angle.

In operation 730, the processor 142 may determine a first power value generated in the first joint based on the first state information. A first gait agility value may be a result of an equation or a function (e.g., an objective function) for calculating a gait agility value of which an input factor is the first torque in addition to a first angular velocity. For example, the processor 142 may determine the first power value based on the first angular velocity and the first torque in a first state. The first power value may be calculated through multiplication of the first angular velocity and the first torque. The calculated first power value may be used as a factor for calculating the first gait agility value that represents gait agility of the user in association with the first torque. When this calculation technique is used, a power value calculated with a greater torque and a lower angular velocity may be smaller than a power value calculated with a relatively small torque and a higher angular velocity. In this case, the relatively small torque may be desirable to obtain a high joint angular velocity.

According to an example embodiment, by repeatedly performing operations 710 through 730, a plurality of torques may be output based on the set of the parameter values of the first generation, state information (e.g., an angular velocity) of the first joint for the output torques may be obtained, and power values generated from the first joint may be calculated based on the state information.

In operation 740, the processor 142 may calculate the first gait agility value that represents gait agility based on the first torque and the first power value. For example, the first gait agility value calculated in operation 740 may be an assessment value for a gait of the user who walks based on the first value of the parameter (or the plurality of sub-parameter values of the first generation).

According to an example embodiment, a first root mean square (RMS) torque for a period of the first generation may be calculated based on the first torque, a first mean power value may be calculated for the calculated period of the first generation based on the first power value, and the first gait agility value for the first generation may be calculated based on the first RMS torque and the first mean power value.

According to an example embodiment, the first gait agility value may be an assessment value that represents suitability of a plurality of torques output onto the user for the first hour or parameter values in association with the torques.

According to an example embodiment, a method of determining the first gait agility value based on the first RMS torque and the first mean power value will be described further with reference to FIG. 10.

In operation 750, the processor 142 may determine a second value of the parameter based on the first gait agility value such that a second gait agility value to be determined (which may be determined for a set of parameter values of a next generation, for example) may increase. For example, the second value of the parameter may be determined by adjusting the first value of the parameter. For example, the second value of the parameter may be determined such that the second gait agility value calculated for the second generation may be greater than the first gait agility value calculated for the first generation.

For example, the processor 142 may determine the second value of the parameter by adjusting the first value of the parameter based on a covariance matrix adaptation evolution strategy (CMA-ES). The second value of the parameter may be a set of parameter values of the second generation. To plot a flow of evolution strategy, the CMA-ES may regard an optimization process of a certain parameter value as a biological evolution process and defines iterations of calculations as a “generation.” The CMA-ES may adaptively update a covariance matrix of a group for a certain value. When the CMA-ES is applied for optimizing a parameter value, a covariance matrix of sub-parameter values of the first generation may be updated using the CMA-ES, and sub-parameter values of the second generation (or the next generation) may thus be generated.

Referring to FIG. 7A, operation 703 may be performed for the determined second value of the parameter in operation 750.

According to an example embodiment, when a test walk is performed for preset generations (e.g., a total of 12 generations), operations 702 through 704 may be performed for each of the generations. Parameter values adjusted through the generations will be described further with reference to FIG. 11.

Figure 8:
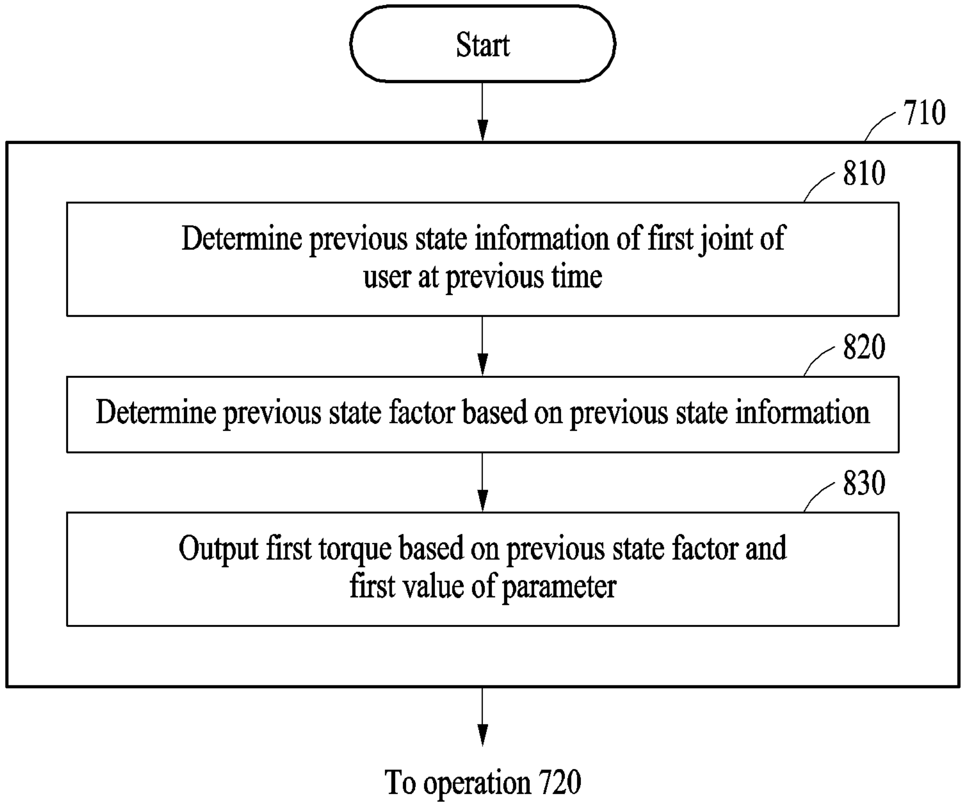
FIG. 8 is a flowchart illustrating an example of a method of outputting a torque based on a parameter value according to an example embodiment.

FIG. 8 is a flowchart illustrating an example of a method of outputting a torque based on a parameter value according to an example embodiment.

According to an example embodiment, operation 710 described above with reference to FIGS. 7A and 7B may include the following operations 810, 820 and 830.

In operation 810, the processor 142 may determine previous state information of a first joint of a user at a previous time. The previous state information of the first joint may include at least one of an angle and an angular velocity of the first joint. For example, when a first time is t, a previous time of the first time may be t−1. According to another example embodiment, a previous state at the previous time may be an initial state. Also, t may be a time at which a $t^{th}$ data sample is obtained, and t−1 may be a time at which a $t-1^{th}$ data sample is obtained.

For example, the previous state information of a right hip joint (or the first joint) and a left hip joint (or a second joint) may be determined.

In operation 820, the processor 142 may determine a previous state factor based on the previous state information. For example, y(t−1) may be calculated as the previous state factor.

In operation 830, the processor 142 may output a first torque at the first time (e.g., t) based on the previous state factor and a first value of the parameter (e.g., a first sub-parameter value). The first time may be a time delayed by a parameter value at the previous time.

The processor 142 may control the motor driver circuit 112 to output the first torque.

Figure 9:
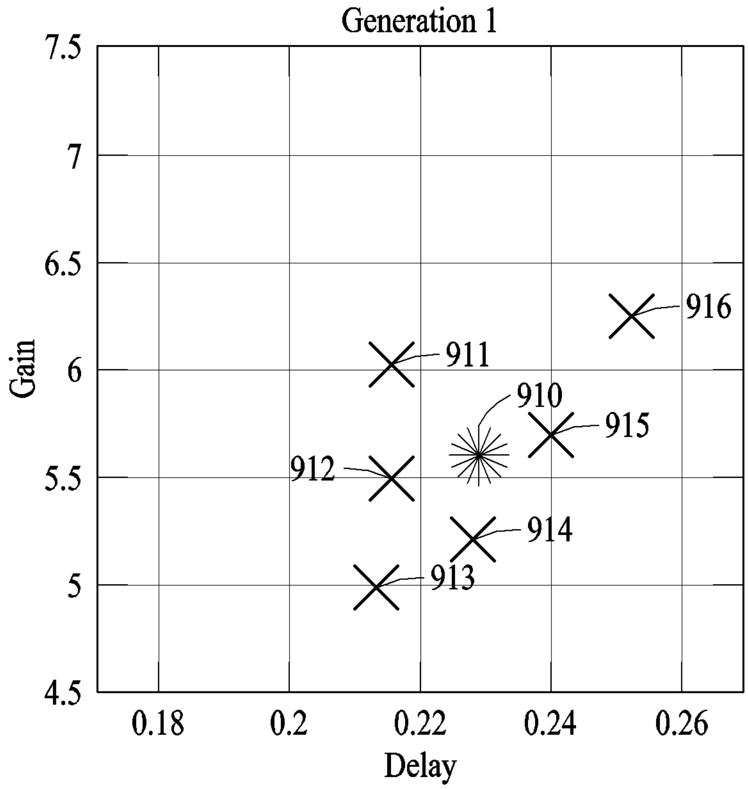
FIG. 9 is a diagram illustrating an example of a set of parameter values of a first generation according to an example embodiment.

FIG. 9 is a diagram illustrating an example of a set of parameter values of a first generation according to an example embodiment.

According to an example embodiment, a default parameter value 910 may be preset in the wearable device 100. For example, the default parameter value 910 may be selected by a user for a test walk. According to another example embodiment, the default parameter value 910 may be a parameter value preset for the test walk. Although the default parameter value 910 is illustrated as a 2D value representing both a delay value and a gain value, it may also be a 1D value representing only the gain value or a 3D value representing further a sensitivity value. For another example, the default parameter value 910 may also be a 2D value representing both the gain value and the sensitivity value simultaneously. Complexity of a calculation for optimizing a parameter value may vary according to a dimension of the parameter value.

According to an example embodiment, the processor 142 of the wearable device 100 may generate a set of parameter values of a first generation based on the default parameter value 910. For example, the set of the parameter values of the first generation may be generated based on the CMA-ES. According to another example embodiment, the set of the parameter values of the first generation may be generated by randomly changing a numerical value of the default parameter value 910.

For example, the set of the parameter values of the first generation may include a first sub-parameter value 911, a second sub-parameter value 912, a third sub-parameter value 913, a fourth sub-parameter value 914, a fifth sub-parameter value 915 and a sixth sub-parameter value 916. The processor 142 may output a torque for a first period set for the first sub-parameter value 911 by applying the first sub-parameter value 911, and output a torque for a second period set for the second sub-parameter value 912 by applying the second sub-parameter value 912 when the first period is ended. The processor may repeat this process for a third period, a fourth period, a fifth period and a sixth period by respectively applying the third sub-parameter value 913, the fourth sub-parameter value 914, the fifth sub-parameter value 915 and the sixth sub-parameter value 916, and perform an assessment on the set of the parameter values of the first generation when a sixth period set for the sixth sub-parameter value 916 is ended. For example, as a result of the assessment of the set of the parameter values of the first generation, a first gait agility value may be calculated assessment.

Although six sub-parameter values in a set of parameter values are illustrated in FIG. 9, the number of sub-parameter values may be set by the user or the processor 142. For example, the number of the sub-parameter values may vary according to the dimension of a sub-parameter value.

According to an example embodiment, calculating the first gait agility value will be described further with reference to FIG. 10.

Figure 10:
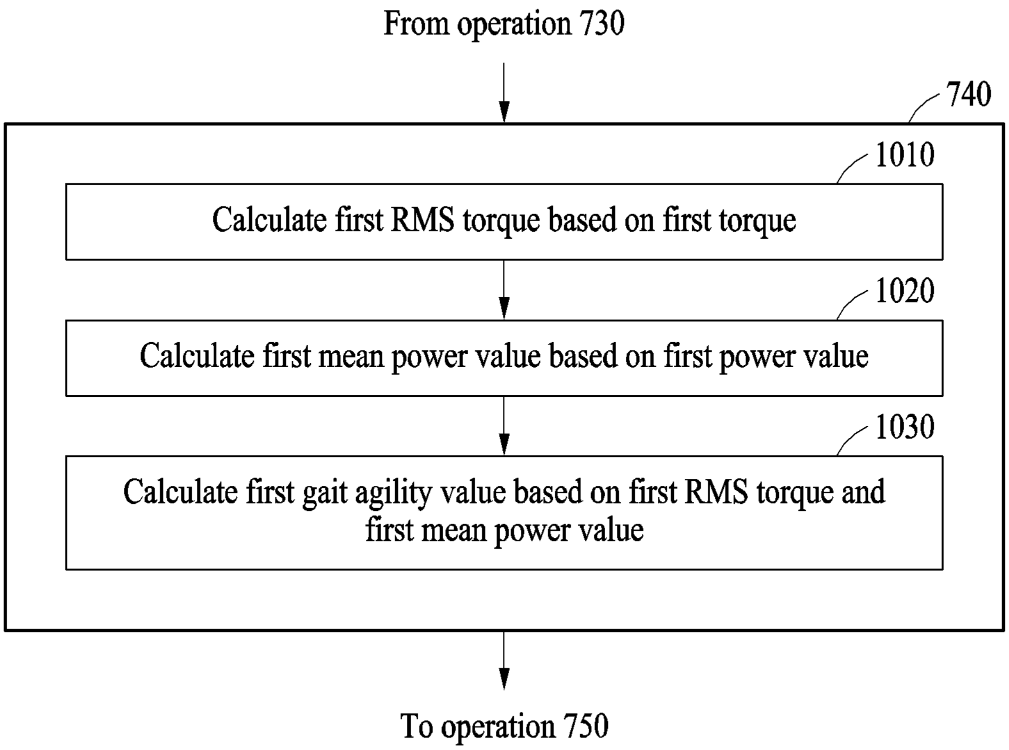
FIG. 10 is a flowchart illustrating an example of a method of calculating a gait agility value based on an input torque and an output power according to an example embodiment.

FIG. 10 is a flowchart illustrating an example of a method of calculating a gait agility value based on an input torque and an output power according to an example embodiment.

According to an example embodiment, operation 740 described above with reference to FIG. 7B may include the following operations 1010, 1020, and 1030.

In operation 1010, the processor 142 may calculate a first RMS torque based on a first torque.

For example, the processor 142 may calculate the first RMS torque with respect to torques output by respective sub-parameter values in a set of parameter values of a first generation. For example, the first RMS torque may be calculated based on Equation 3.

$$\tau_{RMS} = \sqrt{\frac{1}{n}\sum_{i=1}^{n} \tau_i^2} \quad \text{[Equation 3]}$$

In Equation 3, n denotes a total number of sub-parameter values in a set of parameter values of a corresponding generation, $\tau_i$ denotes a torque output by an $i^{th}$ sub-parameter value, and $\tau_{RMS}$ denotes an RMS torque for the corresponding generation.

In operation 1020, the processor 142 may calculate a first mean power value based on a first power value. The first power value may refer to a value of power generated as the first torque is output. The first power value may be calculated through multiplication of the first torque $\tau_i$ and a first angular velocity $\dot{q}_1$. A first angular velocity may be obtained based on first state information of a first joint.

For example, the processor 142 may calculate the first mean power value based on torques output by respective sub-parameter values in the set of the parameter values of the first generation and angular velocities obtained at a time at which the torques are output. For example, the first mean power value may be calculated based on the first power value and a second power value at a second time that follows the first time. The first mean power value may be calculated based on Equation 4.

$$MP = 1/n\sum_{i=1}^{n} \tau_i \dot{q}_i \quad \text{[Equation 4]}$$

In Equation 4, n denotes a total number of sub-parameter values in a set of parameter values of a corresponding generation, $\tau_i$ denotes a torque output by a sub-parameter value at an ith time or sample, $\dot{q}_i$ denotes an ith angular velocity, and MP denotes a mean power value for the corresponding generation.

In operation 1030, the processor 142 may calculate a first gait agility value based on the first RMS torque and the first mean power value. For example, the processor may calculate the gait agility value based on Equation 5. A unit of a value of the calculated gait agility value may be rad/sec.

$$\text{Gait agility value} = \frac{\text{Mean power}}{\text{RMS torque}} \quad \text{[Equation 5]}$$

Figure 11:
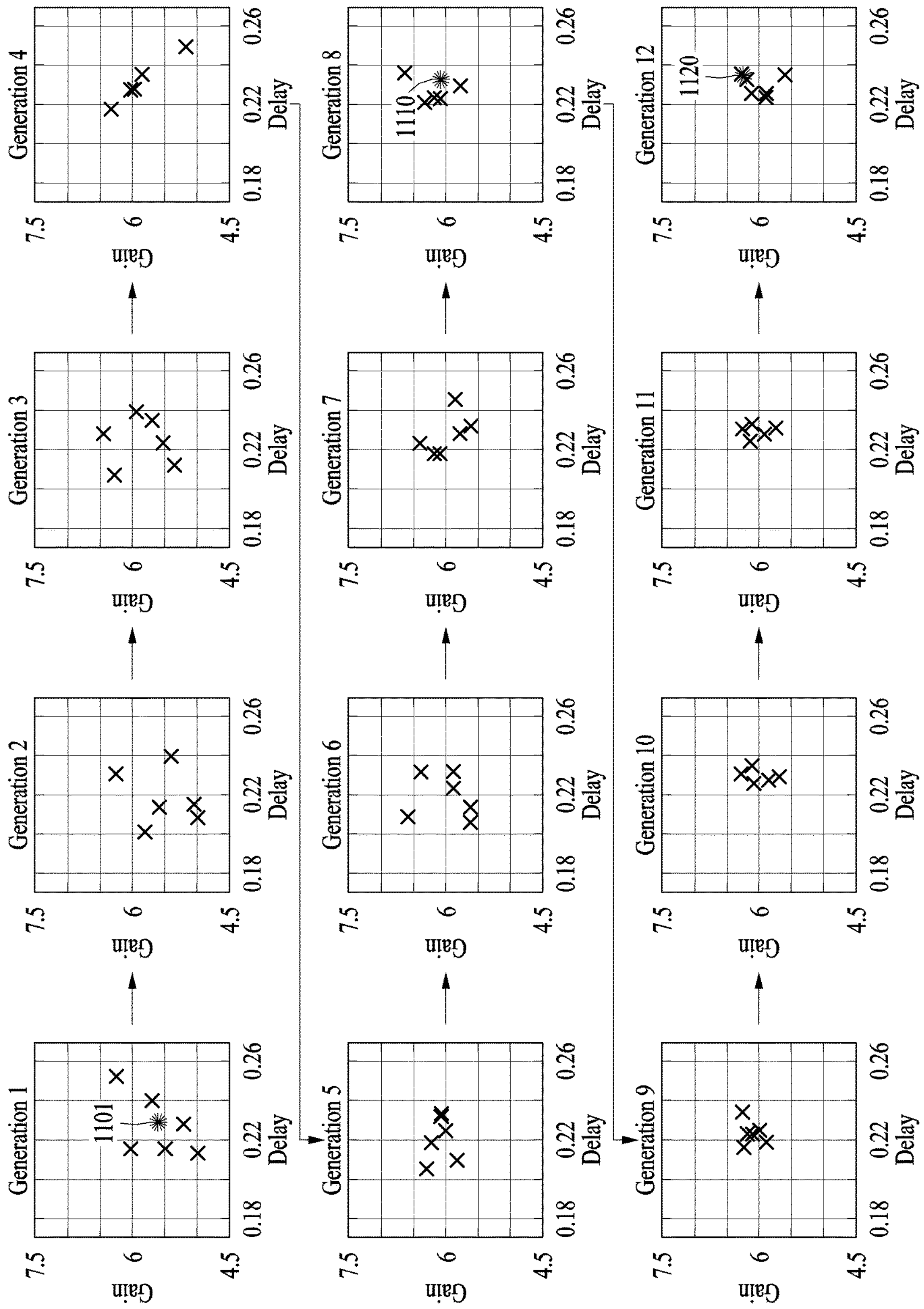
FIG. 11 is a diagram illustrating an example of a method of determining a sub-parameter value of a next generation based on sub-parameter values of a previous generation according to an example embodiment.

FIG. 11 is a diagram illustrating an example of a method of determining a sub-parameter value of a next generation based on sub-parameter values of a previous generation according to an example embodiment.

According to an example embodiment, a test walk may be performed for a preset period, and the preset period may be based on the number of updates of a parameter value. An update of a parameter value may be construed as a change of the parameter value in generation, which is described above. For example, the test walk may be performed during the change of the parameter value from a first generation to a twelfth (or eighth) generation.

According to an example embodiment, each generation may include a preset number (e.g., six) of sub-parameter values. For example, a set of parameter values of the first generation may include sub-parameter values generated based on a default parameter value 1101, and the processor 142 may determine a first gait agility value for the first generation based on the sub-parameter values and generate a set of parameter values of a second generation such that a second gait agility value to be calculated for the second generation increases.

According to an example embodiment, the set of the parameter values of the second generation may be generated using a CMA-ES. The CMA-ES may approximate a Hessian matrix by calculating a covariance matrix at a search point. The CMA-ES may probabilistically generate the search point in a normal distribution, and a derived result may therefore be globally obtainable without a local solution.

For example, when there are six sub-parameter values in the set of the parameter values of the second generation, four of the six may be determined in which a cost decreases from a certain search point and two of the six may be determined in a direction in which the cost increases, through the CMA-ES. The cost may be a value of an objective function of the CMA-ES calculated based on the search point and the sub-parameter values.

As the foregoing operations are repeatedly performed, a final value of the parameter 1110 or 1120 may be determined for a preset threshold generation (e.g., the eighth generation or the twelfth generation).

For example, one of sub-parameter values of the eighth generation may be determined as the final value of the parameter 1110. For another example, a mean value of the sub-parameter values of the eighth generation may be determined as the final value of the parameter 1110.

The final values of the parameter 1110 or 1120 may be used as a gait parameter value optimized for a gait pattern of a user.

Figure 12A:
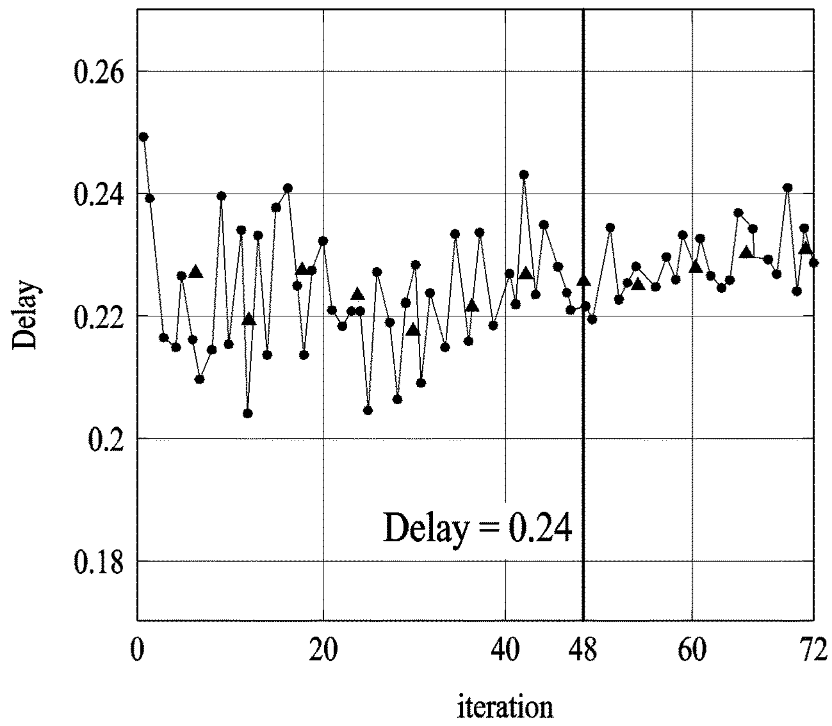
FIGS. 12A and 12B are diagrams illustrating a delay value and a gain value that vary according to sub-parameter values according to an example embodiment.
Figure 12B:
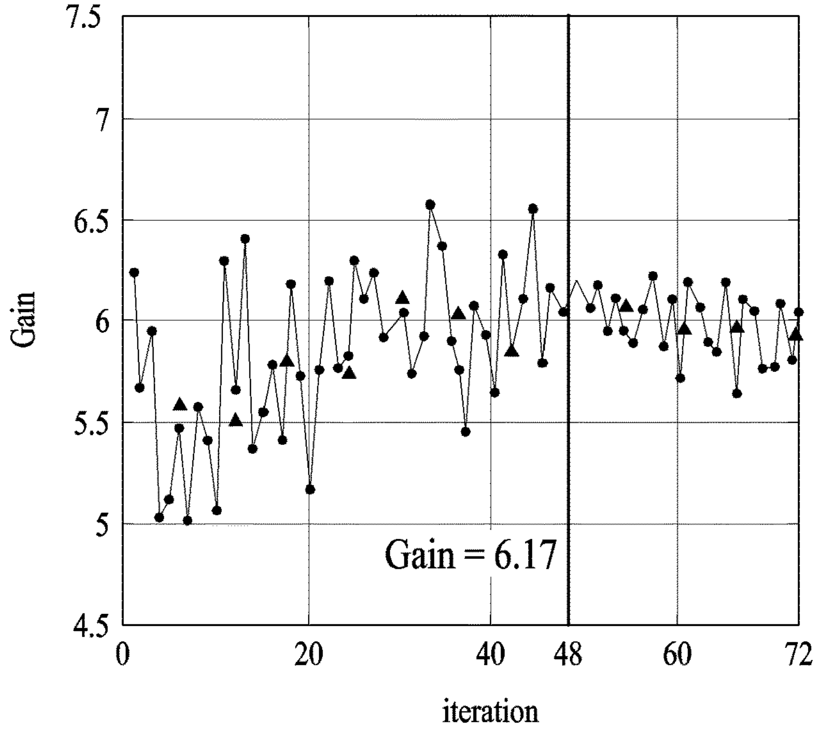

FIGS. 12A and 12B are diagrams illustrating a delay value and a gain value that vary according to sub-parameter values according to an example embodiment.

According to an example embodiment, when each generation includes six sub-parameter values, a plurality of sub-parameter values may be constantly applied to the wearable device 100 based on a threshold generation (e.g., an eighth generation or a twelfth generation).

For example, when the threshold generation is the eighth generation, the processor 142 may apply a total of 48 sub-parameter values to the wearable device 100. When a test walk for the eighth generation is ended, a final value of the parameter is determined based on a set of parameter values of the eighth generation. In the illustrated example, in FIG. 12A, a delay value of the final value of the parameter is 0.24 and in FIG. 12B, a gain value of the final value of the parameter is 6.17. The foregoing description of the eighth generation may be similarly applicable even when the threshold generation is the twelfth generation.

Figure 13:
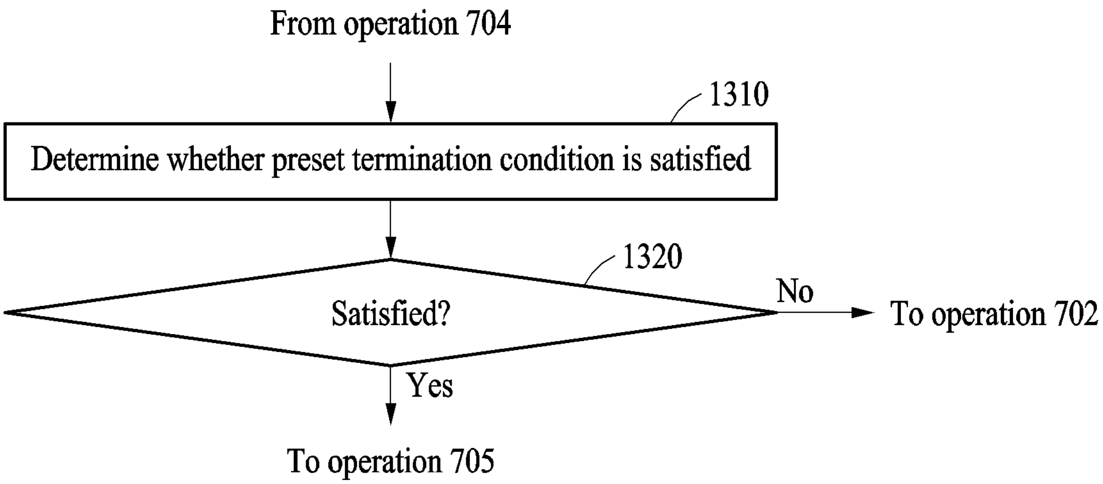
FIG. 13 is a flowchart illustrating an example of a method of determining whether a preset termination condition is satisfied to end adjustment of a parameter value according to an example embodiment.

FIG. 13 is a flowchart illustrating an example of a method of determining whether a termination condition is satisfied to end adjustment of a parameter value according to an example embodiment.

According to an example embodiment, operation 1310 may be further performed after operation 704 described above with reference to FIG. 7A is performed.

In operation 1310, the processor 142 may determine whether a current state satisfies a termination condition set for parameter optimization during a test walk. For example, the set termination condition may include at least one of whether the number of times of adjusting a parameter value corresponds to a threshold adjustment number of times (that is, whether a threshold generation is reached), whether the number of strides of a user corresponds to a threshold stride number of times, and whether the passage of time for adjusting the parameter value corresponds to a threshold time. A stride used herein refers to a process in which a position of a leg returns to the same point through walking. For example, a stride length may be a distance from a position of a left (or right) heel to a next position of the left (or right) heel in the walking.

In operation 1320, based on a determination that the termination condition is not satisfied, the processor 142 proceeds to operation 702 in FIG. 7A to perform the determination of optimal parameter values again. On the other hand, based on a determination that the termination condition is satisfied, the processor 142 proceeds to operation 705 in FIG. 7A to perform the determination of a final value of parameter. The processor 142 may determine a final value of the parameter when the termination condition is satisfied. For example, a most recently adjusted parameter value may be used as the final value of the parameter. For another example, the processor 142 may determine a final value based on a parameter value of a last generation when the termination condition is satisfied.

A method of adjusting a parameter value of the wearable device 100 is described in detail with reference to FIGS. 6 through 13 according to example embodiment of the disclosure. However, the disclosure is not limited thereto, and as such, various methods and algorithms may be used for adjusting the parameter value according to another example embodiment.

The methods according to the above-described example embodiments may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described hardware devices may be configured to act as one or more software modules in order to perform the operations of the above-described examples, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of adjusting a control parameter value performed by a wearable device, the method comprising:

outputting a first torque value to a driver circuit configured to control the wearable device to apply a force to a portion of a body of a user while the user is wearing the wearable device, the first torque value being determined based on a first value of a control parameter, and the control parameter including at least one of magnitude information, output timing information, and sensitivity information;

obtaining a first angular velocity of a first joint in the body of the user in association with the output of the first torque value;

determining, based on the first angular velocity, a second value of the control parameter to change the first angular velocity of the first joint;

outputting a second torque value to the driver circuit, the second torque value being determined based on the second value of the control parameter;

obtaining a second angular velocity of the first joint in the body of the user in association with the output of the second torque value; and determining a final value of the control parameter based on the second value of the control parameter, wherein the determination of the final value is further based on a termination condition on optimization of the control parameter being satisfied after the second angular velocity is obtained, and wherein the determining of the second value of the control parameter to change the first angular velocity of the first joint comprises:

re-determining the second value of the control parameter to change the first angular velocity of the first joint, based on the termination condition being not satisfied after the second angular velocity is obtained, wherein the termination condition comprises at least one of whether a number of times of adjusting a value of the control parameter corresponds to a threshold number of adjustment, whether a number of strides of the user corresponds to a threshold number of strides, and a passage of time for adjusting the value of the control parameter corresponds to a threshold time, and wherein the determining of the second value of the control parameter comprises:

calculating a first gait agility value representing gait agility of the user based on the first angular velocity of the first joint in the body of the user obtained in association with the output of the first torque value; and determining the second value of the control parameter to change the gait agility of the user.

2. The method of claim 1, wherein the first gait agility value is calculated based on the first torque value and the first angular velocity.

3. The method of claim 1, wherein the calculating of the first gait agility value representing gait agility in association with the first torque value comprises:

obtaining the first angular velocity of the first joint at a first time at which the first torque value is output;

determining a first power value generated from the first joint based on the first angular velocity; and calculating the first gait agility value based on the first torque value and the first power value.

4. The method of claim 1, wherein the determining of the second value of the control parameter to change the gait agility of the user comprises:

determining the second value of the control parameter to increase the gait agility of the user based on the first gait agility value.

5. The method of claim 1, wherein the first value of the control parameter comprises a first gain value and a first delay value.

6. The method of claim 3, wherein the determining of the first power value based on the first angular velocity comprises:

determining the first power value based on the first angular velocity and the first torque value.

7. The method of claim 3, wherein the calculating of the first gait agility value based on the first torque value and the first power value comprises:

calculating a first root mean square (RMS) torque value based on the first torque value;

calculating a first mean power value based on the first power value; and calculating the first gait agility value based on the first RMS torque value and the first mean power value.

8. The method of claim 7, wherein the calculating of the first mean power value based on the first power value comprises:

calculating the first mean power value based on the first power value and a second power value related to a second time subsequent to the first time.

9. The method of claim 1, wherein the outputting of the first torque value comprises:

obtaining previous state information of the portion of the body of the user while the user is wearing the wearable device at a previous time;

determining a previous state factor based on the previous state information; and outputting the first torque value based on the previous state factor and the first value of the control parameter.

10. A non-transitory computer-readable storage medium storing a program that causes a processor to perform the method of claim 1.

11. A wearable device comprising:

a processor configured to control the wearable device;

at least one sensor configured to measure a joint angle in a body of a user;

a motor driver circuit configured to be controlled by the processor;

a motor electrically connected to the motor driver circuit; and a support frame configured to transmit a torque output by the motor to a portion of the body of the user;

wherein the processor is configured to:

output a first torque value to the motor driver circuit to control the motor to apply a force to the portion of the body of the user through the support frame while the user is wearing the wearable device, the first torque value being determined based on a first value of a control parameter, and the control parameter including at least one of magnitude information, output timing information, and sensitivity information;

obtain a first angular velocity of a first joint in the body of the user in association with the output of the first torque value;

determine, based on the first angular velocity, a second value of the control parameter to change the first angular velocity of the first joint;

output a second torque value to the motor driver circuit, the second torque value being determined based on the second value of the control parameter;

obtain a second angular velocity of the first joint in the body of the user in association with the output of the second torque value;

determine a final value of the control parameter based on the second value of the control parameter, wherein the determination of the final value is further based on a termination condition on optimization of the control parameter being satisfied after the second angular velocity is obtained; and re-determine the second value of the control parameter to change the first angular velocity of the first joint based on the termination condition being not satisfied after the second angular velocity is obtained, wherein the termination condition comprises at least one of whether a number of times of adjusting a value of the control parameter corresponds to a threshold number of adjustment, whether a number of strides of the user corresponds to a threshold number of strides, and a passage of time for adjusting the value of the control parameter corresponds to a threshold time, and wherein the processor is further configured to:

calculate a first gait agility value representing gait agility of the user based on the first angular velocity of the first joint in the body of the user obtained in association with the output of the first torque value; and determine the second value of the control parameter to change the gait agility of the user.

12. The wearable device of claim 11, wherein the processor is configured to:

obtain the first angular velocity of the first joint from a first time at which the first torque value is output through the sensor;

determine a first power value generated from the first joint based on the first angular velocity; and calculate the first gait agility value based on the first torque value and the first power value.

13. The wearable device of claim 11, wherein the processor is configured to:

determine the second value of the control parameter to change the gait agility of the user based on the first gait agility value.

14. The wearable device of claim 11, wherein the first value of the control parameter comprises a first gain value and a first delay value.

15. The wearable device of claim 12, wherein the processor is configured to:

determine the first power value based on the first angular velocity and the first torque value.

16. The wearable device of claim 12, wherein the processor is configured to:

calculate a first root mean square (RMS) torque value based on the first torque value;

calculate a first mean power value based on the first power value; and calculate the first gait agility value based on the first RMS torque value and the first mean power value.

17. The wearable device of claim 16, wherein the processor is configured to:

calculate the first mean power value based on the first power value and a second power value related to a second time subsequent to the first time.

18. A wearable device comprising:

a memory storing one or more instructions; and a processor configured to execute the one or more instructions to:

output a first torque value to a driver circuit configured to control the wearable device to apply a force to at least a portion of a body of a user while the user is wearing the wearable device, the first torque value being determined based on a first value of a control parameter;

obtain a first angular velocity of a first joint in the body of the user in association with the output of the first torque value;

determine, based on the first angular velocity, a second value of the control parameter to change the first angular velocity of the first joint;

output a second torque value to the driver circuit, the second torque value being determined based on the second value of the control parameter;

obtain a second angular velocity of the first joint in the body of the user in association with the output of the second torque value; and determine a final value of the control parameter based on the second value of the control parameter, wherein the determination of the final value is further based on a termination condition on optimization of the control parameter being satisfied after the second angular velocity is obtained, wherein the processor is further configured to:

calculate a first gait agility value representing gait agility of the user based on the first angular velocity of the first joint in the body of the user obtained in association with the output of the first torque value; and determine the second value of the control parameter to change the gait agility of the user.

* * * * *